(12) United States Patent
Kim et al.

(10) Patent No.: US 12,374,808 B2
(45) Date of Patent: Jul. 29, 2025

(54) UWB ANTENNA AND ELECTRONIC DEVICE INCLUDING SAME

(71) Applicant: SAMSUNG ELECTRONICS CO., LTD., Suwon-si (KR)

(72) Inventors: Dongyeon Kim, Suwon-si (KR); Minsoo Kim, Suwon-si (KR); Hosaeng Kim, Suwon-si (KR); Youngsuk Yoo, Suwon-si (KR); Woosup Lee, Suwon-si (KR); Sukgi Hong, Suwon-si (KR); Haeyeon Kim, Suwon-si (KR); Youngjoon Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 144 days.

(21) Appl. No.: 18/106,245

(22) Filed: Feb. 6, 2023

(65) Prior Publication Data

US 2023/0178901 A1    Jun. 8, 2023

Related U.S. Application Data

(63) Continuation of application No. PCT/KR2021/009976, filed on Jul. 30, 2021.

(30) Foreign Application Priority Data

Aug. 4, 2020    (KR) .................. 10-2020-0097250

(51) Int. Cl.
*H01Q 1/38* (2006.01)
*H01Q 9/04* (2006.01)
*H01Q 21/06* (2006.01)

(52) U.S. Cl.
CPC ......... *H01Q 21/065* (2013.01); *H01Q 9/0414* (2013.01)

(58) Field of Classification Search
CPC ............ H01Q 1/24; H01Q 1/241; H01Q 1/38; H01Q 21/06; H01Q 21/065; H01Q 21/24;
(Continued)

(56) References Cited

U.S. PATENT DOCUMENTS

| 5,164,738 A | 11/1992 | Walter et al. |
| 5,382,959 A * | 1/1995 | Pett .................. H01Q 21/24 343/846 |

(Continued)

FOREIGN PATENT DOCUMENTS

| CN | 105870606 A | 8/2016 |
| CN | 207834568 U | 9/2018 |

(Continued)

OTHER PUBLICATIONS

Communication dated Nov. 9, 2021, issued by the International Searching Authority in counterpart International Application No. PCT/KR2021/009976 (PCT/ISA/210).

(Continued)

*Primary Examiner* — Tho G Phan
(74) *Attorney, Agent, or Firm* — Sughrue Mion, PLLC

(57) ABSTRACT

An ultra-wide band (UWB) antenna including a dielectric substrate, and first and second conductive layers arranged on opposite sides of the dielectric substrate. The first conductive layer includes a first, second and third patch antennae, each configured to receive a first UWB signal and a second UWB signal, wherein the second and third patch antennae are spaced apart from the first patch antenna in specific directions. The first conductive layer also includes first, second, and third transmission lines connecting, respectively, the first, second, and third patch antennae to a connector. The second conductive layer includes a ground pattern overlapping the first, second, and third patch antennae and the first, second, and third transmission lines, when (Continued)

facing the second conductive layer in a third direction that is perpendicular to the first direction and the second direction.

12 Claims, 28 Drawing Sheets

(58) Field of Classification Search
CPC .......... H01Q 3/26; H01Q 3/2605; H01Q 5/25; H01Q 9/04; H01Q 9/0407; H01Q 9/0414; H01Q 9/0428
See application file for complete search history.

(56) References Cited

U.S. PATENT DOCUMENTS

| | | | |
|---|---|---|---|
| 6,531,984 | B1 | 3/2003 | Johannisson et al. |
| 7,692,592 | B2 * | 4/2010 | Ly .................... H01Q 9/0407 |
| | | | 343/702 |
| 8,111,196 | B2 * | 2/2012 | Thiam .................... H01Q 5/40 |
| | | | 455/78 |
| 8,378,894 | B2 * | 2/2013 | Kikuchi ................ H01Q 1/243 |
| | | | 343/846 |
| 8,681,048 | B2 | 3/2014 | Nishida |
| 9,391,370 | B2 * | 7/2016 | Tzanidis .................. H01Q 9/20 |
| 9,391,375 | B1 | 7/2016 | Bales et al. |
| 9,444,135 | B2 * | 9/2016 | Tong ........................ H01Q 1/40 |
| 10,847,889 | B2 * | 11/2020 | Oladeinde ............ H01Q 21/065 |
| 11,394,119 | B2 * | 7/2022 | Hamabe ............... H01Q 9/0421 |
| 2009/0256777 | A1 | 10/2009 | Nagai |
| 2017/0097409 | A1 | 4/2017 | Okamoto |
| 2018/0217248 | A1 | 8/2018 | Nakayama et al. |
| 2020/0021011 | A1 | 1/2020 | Cooper et al. |

FOREIGN PATENT DOCUMENTS

| | | |
|---|---|---|
| CN | 108832280 A | 11/2018 |
| GB | 2 458 492 A | 9/2009 |
| JP | 2018-124263 A | 8/2018 |
| KR | 10-2005-0043178 A | 5/2005 |

OTHER PUBLICATIONS

Communication dated Nov. 9, 2021, issued by the International Searching Authority in counterpart International Application No. PCT/KR2021/009976 (PCT/ISA/237).
Office Action issued Jul. 1, 2024 by the Korean Patent Office for KR Patent Application No. 10-2020-0097250.
Communication dated Dec. 11, 2023, issued by the European Patent Office in counterpart European Application No. 21853152.3.
European Extended Search Report issued Mar. 4, 2024 by the European Patent Office for EP Patent Application No. 21853152.3.
Communication dated Jan. 27, 2025 issued by the Intellectual Property India in Indian Patent Application No. 202317007035.
Communication dated Apr. 1, 2025 issued by the Korean Intellectual Property Office in Korean Patent Application No. 10-2020-0097250.

* cited by examiner

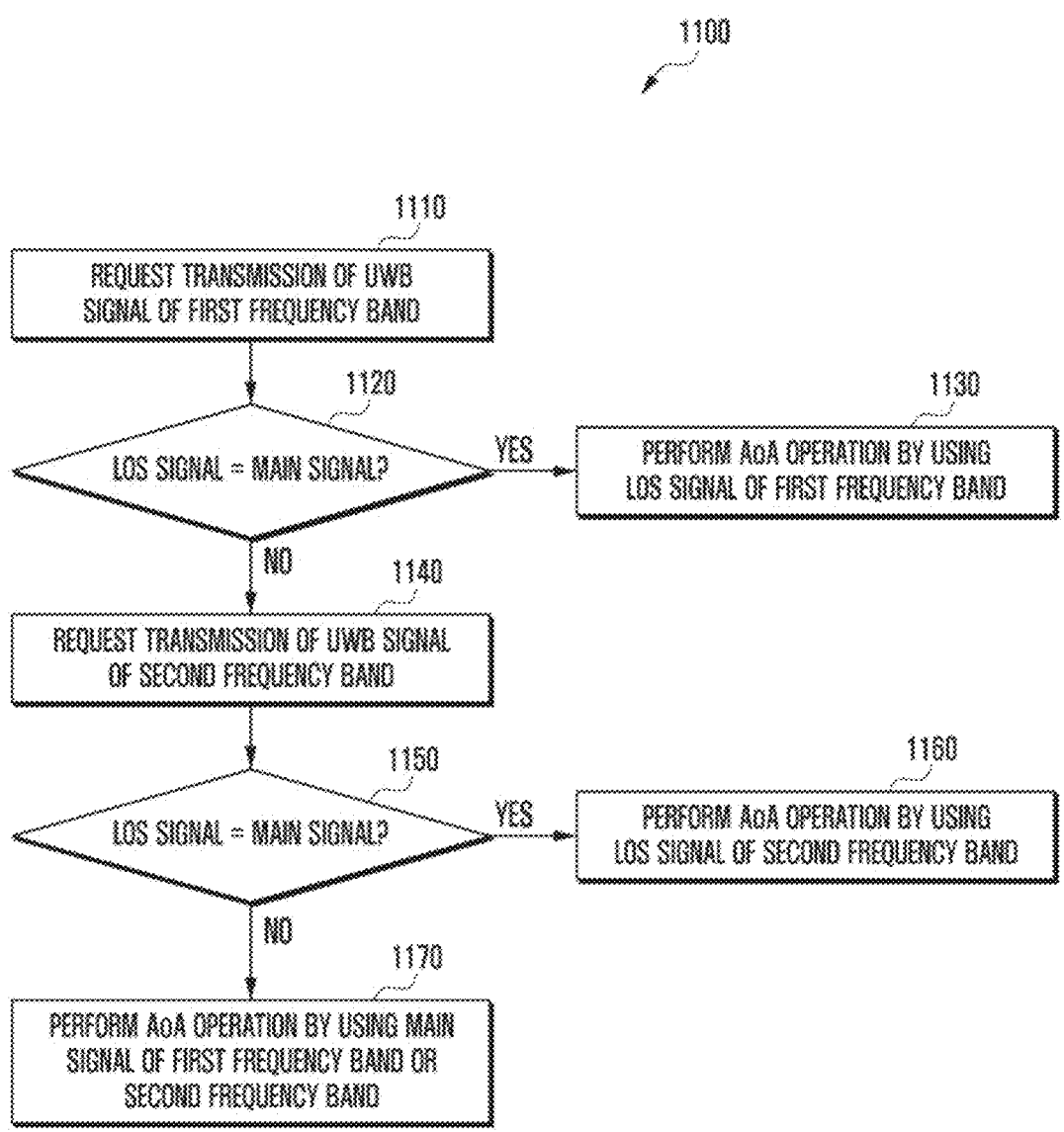

US 12,374,808 B2

UWB ANTENNA AND ELECTRONIC DEVICE INCLUDING SAME

CROSS-REFERENCE TO RELATED APPLICATIONS

This application is a by-pass continuation of International Application No. PCT/KR2021/009976, filed on Jul. 30, 2021, which is based on and claims priority to Korean Patent Application No. 10-2020-0097250, filed on Aug. 4, 2020, in the Korean Intellectual Property Office, the disclosures of which are incorporated by reference herein in their entireties.

BACKGROUND

1. Field

Various embodiments of the disclosure relate to an electronic device including an ultra-wideband (UWB) antenna.

2. Description of Related Art

An electronic device (e.g., an initiator) may perform UWB communication with another electronic device (e.g., a responder) to perform a positioning operation of searching for the location of another electronic device. For example, the electronic device may compute an angle of arrival (AoA) of an RF signal received from another electronic device by using a UWB antenna including at least two patch antennas, and determine the location of another electronic device by using the AoA.

An AoA may include an azimuth angle (e.g., a horizontal angle) and an elevation angle (e.g., a vertical angle), and a UWB antenna may include three patch antennas to measure the azimuth angle and the elevation angle.

Patch antennas may be generally formed on a substrate. A transmission line for connecting a patch antenna to a UWB communication circuit may be implemented on a flexible printed circuit board (FPCB). However, the FPCB may be bent when patch antennas are assembled in an electronic device, the patch antennas are generally separated from each other, and thus it may not be easy to arrange the patch antennas in a space inside a housing of the electronic device The UWB antenna may also be implemented as an FPCB having a multi-layer structure. For example, the UWB antenna may include a layer on which patch antennas are formed, a layer on which a transmission line is formed, and a ground layer. However, such a multi-layer structure may be complex because there are many via processes for electrically connecting the transmission line and the patch antenna. The via processes may cause high costs.

A UWB antenna structure is needed which can be not only easily disposed in a space inside a housing but also simply manufactured.

The technical problems to be solved in the disclosure are not limited to the above-mentioned technical problems, and other unmentioned technical problems can be apparently understood from the description below by those skilled in the art to which the disclosure belongs.

SUMMARY

In accordance with an aspect of the disclosure, an ultra-wideband (UWB) antenna includes: a dielectric substrate including a first surface and a second surface; a first conductive layer disposed on the first surface of the dielectric substrate, the first conductive layer including a first patch antenna, a second patch antenna, a third patch antenna, a first transmission line, a second transmission line, a third transmission line, and a connector; and a second conductive layer disposed on the second surface of the dielectric substrate, wherein the first patch antenna comprises a structure configured to receive a first UWB signal of a first frequency band in which a polarity direction of an electric field of the first UWB signal is a vertical linear polarization, and a second UWB signal of a second frequency band in which a polarity direction of an electric field of the second UWB signal is a horizontal linear polarization, wherein the second patch antenna is spaced apart from the first patch antenna in a first direction and has a structure identical to the structure of the first patch antenna; wherein the third patch antenna is spaced apart from the first patch antenna in a second direction perpendicular to the first direction and has a structure identical to the structure of the first patch antenna, wherein the first transmission line is configured to connect the connector and the first patch antenna, the second transmission line is configured to connect the connector and the second patch antenna, and the third transmission line is configured to connect the connector and the third patch antenna, and wherein the second conductive layer includes a ground pattern which overlaps with the first patch antenna, the second patch antenna, the third patch antenna, the first transmission line, the second transmission line, and the third transmission line when facing the second conductive layer in a third direction that is perpendicular to the first direction and the second direction.

The second conductive layer may further include a first slit disposed between the first patch antenna and the second patch antenna when facing the second conductive layer in the third direction.

The first transmission line, the second transmission line, and the third transmission may each be disposed between the first patch antenna and the third patch antenna, and the first transmission line, the second transmission line, and the third transmission line may be arranged so as not to overlap with one another.

The second conductive layer further include a second slit disposed between the first transmission line and the second transmission line, a third slit disposed between the second transmission line and the third transmission line, a fourth slit disposed between the third patch antenna and the third transmission line, and a fifth slit disposed between the first patch antenna and the first transmission line.

Each of the first patch antenna, the second patch antenna, and the third patch antenna may be a quadrangle having a first side and a second side extending in parallel to the first direction and a third side and a fourth side extending in parallel to the second direction. Each respective first side may include a first slit formed towards an inside of the quadrangle, wherein each respective first slit is parallel to the second direction. Each respective second side may include a second slit formed towards an inside of the quadrangle, wherein each respective second slit is parallel to the second direction. Each respective third side may include a third slit, wherein each respective third slit is parallel to the first direction, and each respective fourth side may include a fourth slit, wherein each respective fourth slit is parallel to the first direction.

Each respective first slit and second slit may have a length configured to cause the UWB antenna to resonate in one of UWB communication channel 5 and UWB communication channel 9, each respective third slit and fourth slit may have a length configured to cause the UWB antenna to resonate in a UWB communication channel, from among UWB communication channel 5 and UWB communication channel 9, which each respective first slit and second slit is not configured to cause the UWB antenna to resonate in, channel 5 is about 6.25 GHz to 6.75 GHz, and channel 9 is about 7.75 GHz to 8.25 GHz.

Each of the first patch antenna, the second patch antenna, and the third patch antenna also include a feeding point disposed at a left upper corner of the respective quadrangle when viewed from the third direction.

Each of the first patch antenna, the second patch antenna, and the third patch antenna may also include a feeding point, wherein each respective feeding point is disposed at a corner of the respective quadrangle closest to the connector.

In accordance with another aspect of the disclosure, an ultra-wideband (UWB) antenna includes: a dielectric substrate comprising a first surface and a second surface; a first conductive layer disposed on the first surface of the dielectric substrate, the first conductive layer comprising a first patch antenna, a second patch antenna, a third patch antenna, a first transmission line, a second transmission line, a third transmission line, and a connector; and a second conductive layer disposed on the second surface of the dielectric substrate, wherein the first patch antenna comprises a structure configured to receive a UWB signal in which a polarity direction of an electric field is a circular polarization, wherein the second patch antenna is spaced apart from the first patch antenna in a first direction while not overlapping with the first patch antenna and comprises the structure of the first patch antenna, wherein the third patch antenna is spaced apart from the first patch antenna in a second direction perpendicular to the first direction while not overlapping with the first patch antenna and comprises the structure of the first patch antenna, wherein the first transmission line is configured to connect the connector and the first patch antenna, the second transmission line is configured to connect the connector and the second patch antenna, and the third transmission line is configured to connect the connector and the third patch antenna, and wherein the second conductive layer comprises a ground pattern which overlaps with the first patch antenna, the second patch antenna, the third patch antenna, the first transmission line, the second transmission line, and the third transmission line when facing the second conductive layer in a third direction perpendicular to the first direction and the second direction.

Each of the first patch antenna, the second patch antenna, and the third patch antenna may be a quadrangle which may include a first side and a second side extending in parallel to the first direction, a third side and a fourth side extending in parallel to the second direction, a first corner, and a second corner positioned diagonally from the first corner, wherein a triangular portion of each respective first corner and each respective second corner is removed.

Each respective first side may include a first slit formed towards an inside of the quadrangle, wherein each respective first slit is parallel to the second direction. Each respective second side may include a second slit formed towards an inside of the quadrangle, wherein each respective second slit is parallel to the second direction. Each respective third side may include a third slit, wherein each respective third slit is parallel to the first direction. Each respective fourth side may include a fourth slit, wherein each respective fourth slit is parallel to the first direction.

Each respective first slit, second slit, third slit, and fourth slit may have a length configured to cause the UWB antenna to resonate in one of UWB communication channels 5 and 9, wherein UWB communication channel 5 is about 6.25 GHz to 6.75 GHz and UWB communication channel 9 is about 7.75 GHz to 8.25 GHz.

In accordance with another aspect of the disclosure, an electronic device includes: an ultra-wideband (UWB) antenna; at least one processor; and a communication circuit configured to convert a baseband signal received from the processor into a converted radio frequency (RF) signal of a frequency band designated to be used for UWB communication, and output the converted RF signal to the UWB antenna and convert an RF signal received from the UWB antenna into a converted baseband signal, and output the converted baseband signal to the processor, wherein the UWB antenna may include a structure configured to receive a first UWB signal in which a polarity direction of an electric field of the first UWB signal is a vertical linear polarization and a second UWB signal in which a polarity direction of an electric field of the second UWB signal is a horizontal linear polarization, and wherein the processor is configured to: receive a UWB signal of a first communication channel from an external electronic device through the communication circuit, determine whether the UWB signal of the first communication channel is a main signal of the first communication channel, and based on a determination that the UWB signal of the first communication channel is the main signal of the first communication channel, perform an angle of arrival (AoA) operation using the UWB signal of the first communication channel; based on a determination that the UWB signal of the first communication channel is not the main signal of the first communication channel, transmit a message to the external electronic device through the communication circuit requesting the external electronic device to transmit a UWB signal of a second communication channel, receive the UWB signal of the second communication channel from the external electronic device through the communication circuit, determine whether the UWB signal of the second communication channel is a main signal of the second communication channel, and based on a determination that the UWB signal of the second communication channel is the main signal of the second communication channel, perform an AoA operation using the UWB signal of the second communication channel; and based on a determination that the UWB signal of the second communication channel is not the main signal of the second communication channel, perform an AoA operation using the main signal of the first communication channel or the main signal of the second communication channel.

The processor may also be configured to: compare a first difference value indicating a strength difference between the UWB signal of the first communication channel and the main signal of the first communication channel with a second difference value indicating a strength difference between the UWB signal of the second communication channel and the main signal of the second communication channel; based on a determination that the first difference value is greater than the second difference value, perform an AoA operation by using the main signal of the first communication channel; and based on a determination that the second difference value is greater than the first difference value, perform an AoA operation by using the main signal of the second communication channel.

Additionally, the UWB signal of the first communication channel may be one of the first UWB signal and the second UWB signal, and the UWB signal of the second communication channel is the other of the first UWB signal and the second UWB signal, wherein the first communication channel is channel 9 among UWB communication channels, wherein the second communication channel is channel 5 among UWB communication channels, and wherein channel 5 is about 6.25 GHz to 6.75 GHz, and channel 9 is about 7.75 GHz to 8.25 GHz.

The UWB antenna may include: a first patch antenna comprising a structure configured to receive the first UWB signal and the second UWB signal; a second patch antenna spaced apart from the first patch antenna in a first direction while not overlapping with the first patch antenna, wherein the second patch antenna comprises the structure of the first patch antenna; a third patch antenna spaced apart from the first patch antenna in a second direction perpendicular to the first direction while not overlapping with the first patch antenna, wherein the third patch antenna comprises the structure of the first patch antenna; a first transmission line configured to connect the first patch antenna to a connector; a second transmission line configured to connect the second patch antenna to the connector; and a third transmission line configured to connect the third patch antenna to the connector, and wherein the second conductive layer comprises a ground pattern which overlaps with the first patch antenna, the second patch antenna, the third patch antenna, the first transmission line, the second transmission line, and the third transmission line when facing the second conductive layer in a third direction perpendicular to the first direction and the second direction.

Various embodiments of the disclosure may provide a UWB antenna which can be easily disposed in an electronic device and relatively simply manufactured. According to various embodiments of the disclosure, costs of an UWB antenna included in an electronic device can be reduced. The electronic device can measure the location of another electronic device by using the UWB antenna.

In addition, various effects directly or indirectly identified through the disclosure can be provided.

BRIEF DESCRIPTION OF THE DRAWINGS

The above and other aspects, features, and advantages of example embodiments of the present disclosure will be more apparent from the following description taken in conjunction with the accompanying drawings, in which:

FIG. 11 illustrates operations of a processor for positioning according to an embodiment.

DETAILED DESCRIPTION

Figure 1:
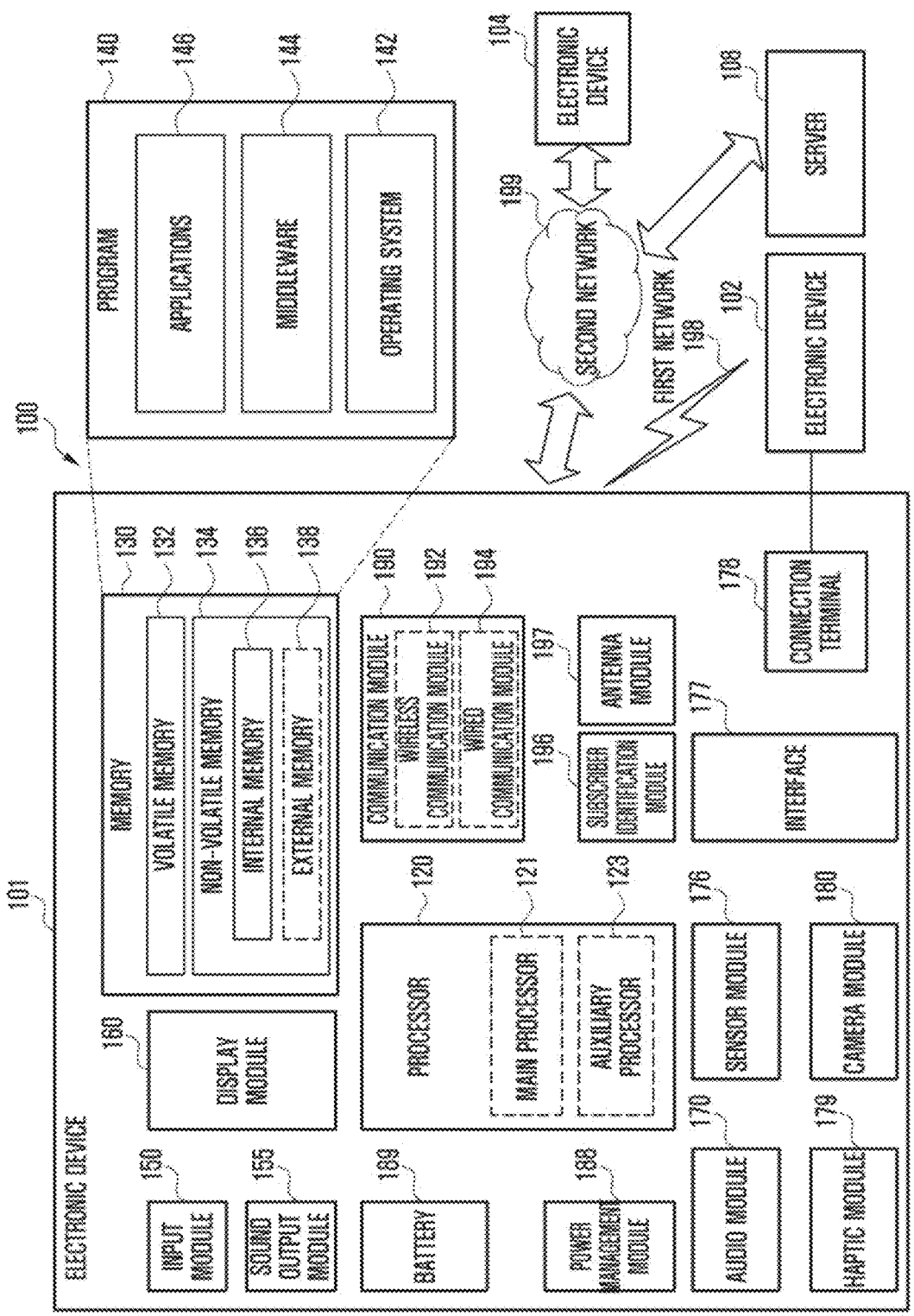
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
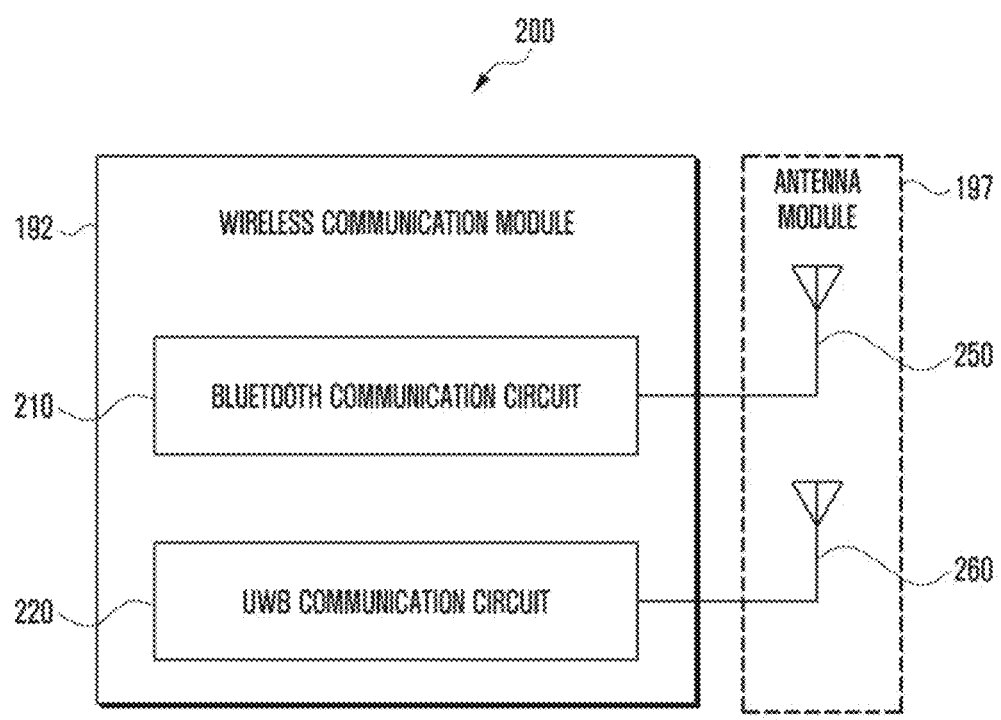
FIG. 2 is a block diagram illustrating a wireless communication module and an antenna module of an electronic device according to various embodiments.

FIG. 2 is a block diagram 200 illustrating a wireless communication module 192 and an antenna module 197 of an electronic device 101 according to various embodiments. Referring to FIG. 2, the wireless communication module 192 may include a Bluetooth communication circuit 210 and/or a UWB communication circuit 220. The antenna module 197 may include a Bluetooth antenna 250 connected to the Bluetooth communication circuit 210, and/or a UWB antenna 260 connected to the UWB communication circuit 220. At least one function of the Bluetooth communication circuit 210 and the UWB communication circuit 220 may be controlled by a processor 120 (e.g., an application processor and/or a communication processor).

The Bluetooth communication circuit 210 may support establishment of a Bluetooth communication channel (or session) corresponding to a frequency band designated to be used for Bluetooth (e.g., Bluetooth low energy (BLE)), among bands to be used for wireless communication with an external electronic device (e.g., the external electronic device 102 of FIG. 1). The Bluetooth communication circuit 210 may support Bluetooth communication with the external electronic device through the Bluetooth communication channel. During transmission, the Bluetooth communication circuit 210 may convert a baseband signal generated by the processor 120 (e.g., the application processor and/or the communication processor) and received from the processor 120 into an RF signal of a Bluetooth band, and transmit the converted signal to the outside through the Bluetooth antenna 250. During reception, the Bluetooth communication circuit 210 may acquire an RF signal of a Bluetooth band (e.g., about 2.4 GHz) through the Bluetooth antenna 250, and convert the acquired RF signal into a baseband (e.g., a few MHz or lower) signal to transmit the converted signal to the processor 120.

The UWB communication circuit 220 may support establishment of a UWB communication channel (or session) corresponding to a frequency band (e.g., about 3.1 GHz to 10.6 GHz) designated to be used for UWB communication, among bands to be used for wireless communication with an external electronic device (e.g., the external electronic device 102 of FIG. 1). The UWB communication circuit 220 may support UWB communication with the external electronic device through the UWB communication channel. During transmission, the UWB communication circuit 220 may convert a baseband signal generated by the processor 120 (e.g., the application processor and/or the communication processor) and received from the processor 120 into an RF signal of a UWB band so as to transmit the same to the outside through the UWB antenna 260. During reception, the UWB communication circuit 220 may acquire an RF signal of a UWB band through the UWB antenna 260, and convert the acquired RF signal into a baseband signal to transmit the converted signal to the processor 120. The wireless communication module 192 may further include a filter (e.g., a UWB band pass filter) for filtering out an RF signal of the UWB band from an RF signal received from the UWB antenna 260 and transferring the same to the UWB communication circuit 220. The UWB antenna 260 may include multiple antennas. For example, the UWB antenna 260 may include an RF signal transmission or reception first antenna or an RF signal reception second antenna and/or third antenna.

According to various embodiments, Bluetooth may be utilized as a trigger for activating UWB communication. For example, BLE has relatively lower accuracy in positioning compared to other short-distance communication technologies (e.g., UWB technology), but has low consumption power and has a long recognition distance (e.g., a distance within which the existence of a surrounding external electronic device 102 can be recognized), and thus BLE may be used for triggering activation of positioning communication. In an embodiment, the processor 120 may receive a signal (e.g., an advertising or broadcasting packet) for connection with the external electronic device 102 to the external electronic device 102 through the Bluetooth communication circuit 210. For example, the external electronic device 102 may transmit a signal, as an advertiser (or a broadcaster), and the electronic device 101 may periodically scan a signal, as an observer. When the strength (e.g., RSSI) of a received signal has a value greater than a designated threshold value, or the strength of the signal is recognized to get stronger, the processor 120 may determine to activate UWB-employed positioning communication. Based on such a determination, the processor 120 may establish a UWB communication channel (e.g., a second frequency band (e.g., ch5, an about 6.5 GHz, or about 6.25 to 6.75 GHz) or a first frequency (e.g., ch9, about 8 GHz band, or about 7.75 to 8.25 GHz)) with the external electronic device 102 by using the UWB communication circuit 220. For example, when the UWB communication circuit 220 is in a disabled state (e.g., a sleep state or a power-off state), the processor 120 may, based on the determination, convert the state of the UWB communication circuit 220 into an enabled state, establish a UWB communication channel with the external electronic device 102 by using the UWB communication circuit 220, and perform positioning communication with the external electronic device 102 through the established UWB communication channel. In another embodiment, the processor 120 may establish a BLE communication channel with the external electronic device 102 by using the Bluetooth communication circuit 210. The processor 120 may determine to activate the UWB-employed positioning communication based on the strength of the signal received from the external electronic device 102 through the established BLE communication channel (e.g., when the strength has a value greater than a designated threshold value, or the strength of the signal gets stronger). According to such determination, the processor 120 may establish a UWB communication channel with the external electronic device 102 by using the UWB communication circuit 220, and perform positioning communication with the external electronic device 102 through the established UWB communication channel. A communication technology (e.g., Wi-Fi) other than the Bluetooth may be also used as a trigger for activating positioning communication.

Figure 3A:
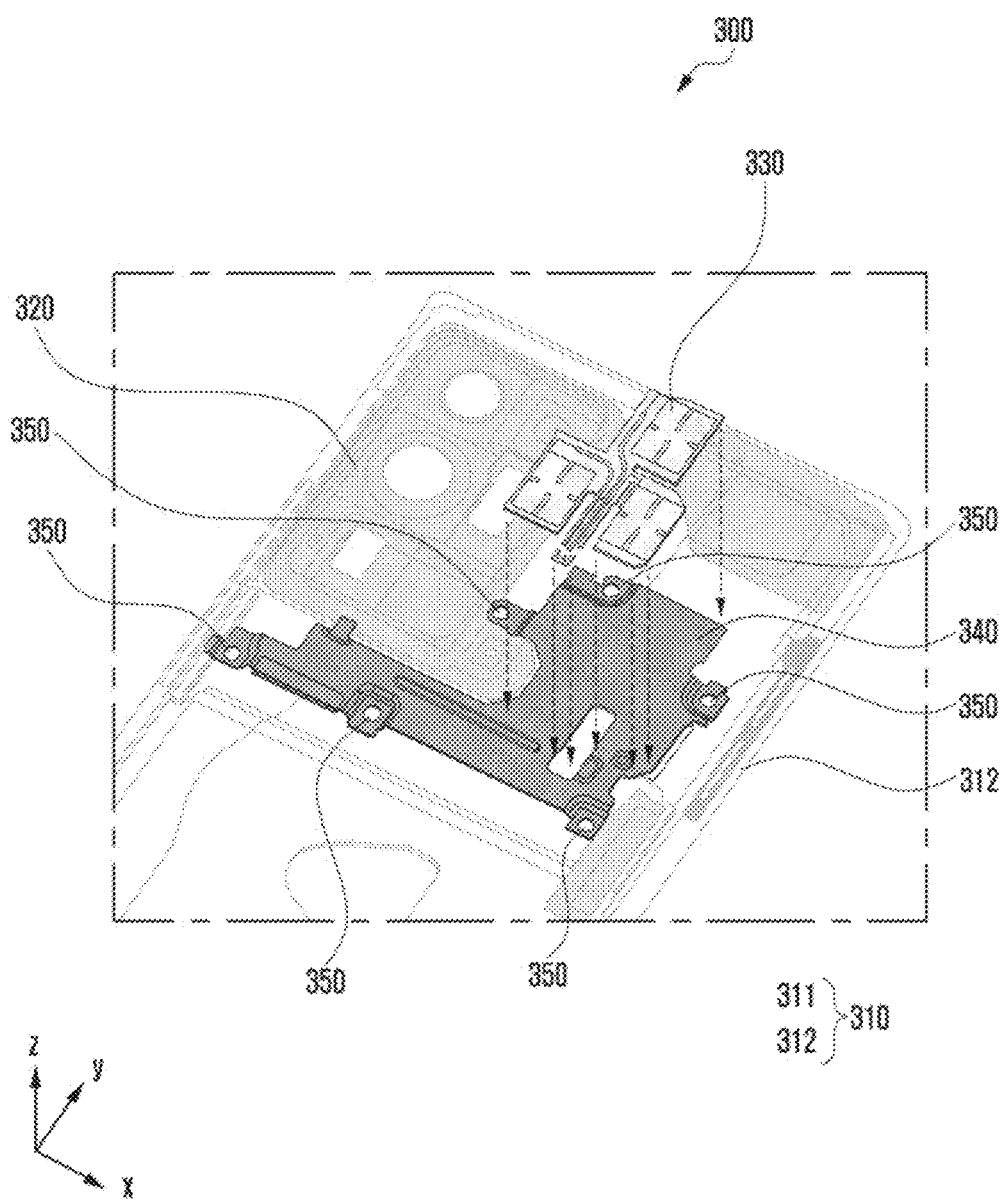
FIGS. 3A and 3B illustrate disposition of a UWB antenna in a portable electronic device having a bar-shape housing structure according to an embodiment.
Figure 3B:
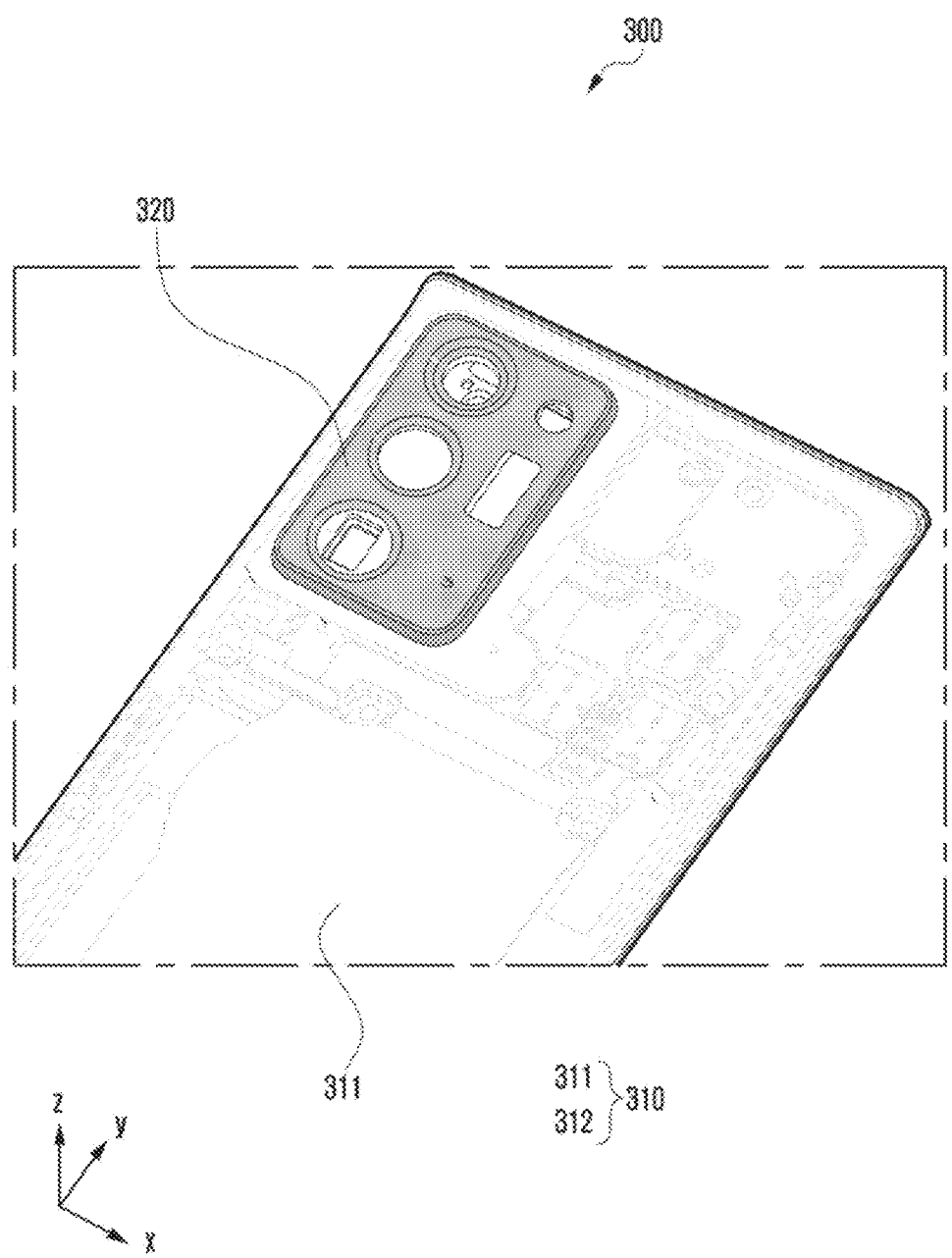

FIGS. 3A and 3B illustrate disposition of a UWB antenna in a portable electronic device 300 (e.g., the electronic device 101 of FIG. 1) having a bar-shaped housing structure according to an embodiment. A surface on which a display (e.g., the display module 160 of FIG. 1) of the portable electronic device 300 may be defined as a front surface, a surface opposite to the front surface may be defined as a rear surface of the portable electronic device 300, and a surface surrounding a space between the front surface and the rear surface may be defined as a side surface of the portable electronic device 300. FIG. 3A is a view illustrating a portable electronic device 300, the rear cover of which is removed, and FIG. 3B illustrates a portable electronic device 300 to which the rear cover thereof is coupled. Referring to FIGS. 3A and 3B, a portable electronic device 300 (e.g., the electronic device 101 of FIG. 1) may include a housing 310, a camera cover 320, a UWB antenna 330, and/or a support member 340.

According to an embodiment, the housing 310 may include a front cover, a rear cover 311, and/or a side frame 312. The UWB antenna 330 and the support member 340 may be arranged inside the housing 310. In an embodiment, the camera cover 320 may decorate, as a cover of a camera module (e.g., the camera module 180) disposed inside the housing 310, the camera module, and may be implemented as metal or polymer.

According to an embodiment, the UWB antenna 330 (e.g., the UWB antenna 260 of FIG. 2) may be disposed inside the housing 310 while not overlapping with the camera module when facing the rear surface. The UWB antenna 330 may be electrically disconnected from the camera cover 320, and may be disposed between the rear cover 311 and the support member 340.

According to an embodiment, the support member 340 may be disposed between the UWB antenna 330 and a substrate (e.g., printed circuit board (PCB)). For example, the UWB antenna 330 may be disposed on the support member 340. The support member 340 may be implemented as, for example, metal (e.g., SUS) or polymer. In an embodiment, the support member 340 may include holes 350 formed to be fixed inside the housing 310 by using fixing members (e.g., screws). For example, the support member 340 may be electrically connected to the side frame 312 (e.g., a metal body) through screws. For example, the UWB antenna 330 may be electrically connected to a UWB communication circuit (e.g., the UWB communication circuit 220 of FIG. 2) through a signal line formed on the substrate.

According to an embodiment, the portable electronic device (e.g., the electronic device 101 of FIG. 1) may have a foldable housing which is divided into two housings with reference to a folding axis. A first part of display (e.g., a flexible display) may be disposed on a first housing, and a second part of the display may be disposed on a second housing. The foldable housing may be implemented in an in-folding scheme in which the first part and the second part face each other when the portable electronic device is folded. Alternatively, the foldable housing may be implemented in an out-folding scheme in which the first part and the second part face are oriented opposite to each other when the portable electronic device is folded. A surface on which the first part and the second part of the display are arranged may be defined as a front surface of the portable electronic device, a surface opposite to the front surface may be defined as a rear surface of the portable electronic device, and a surface surrounding a space between the front surface and the rear surface may be defined as a side surface of the portable electronic device.

Figure 4A:
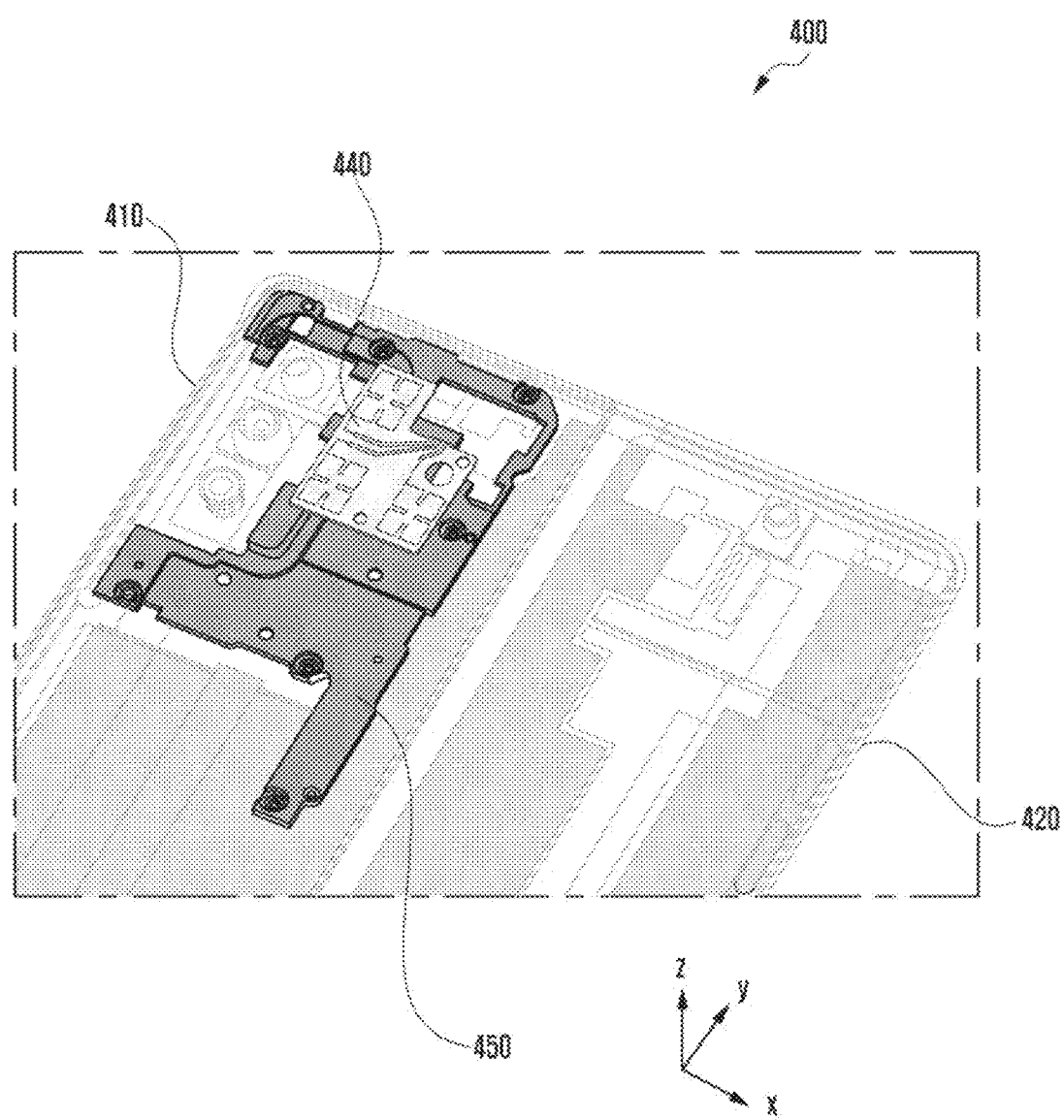
FIGS. 4A and 4B illustrate disposition of a UWB antenna in a portable electronic device having an in-folding scheme foldable housing structure according to an embodiment.
Figure 4B:
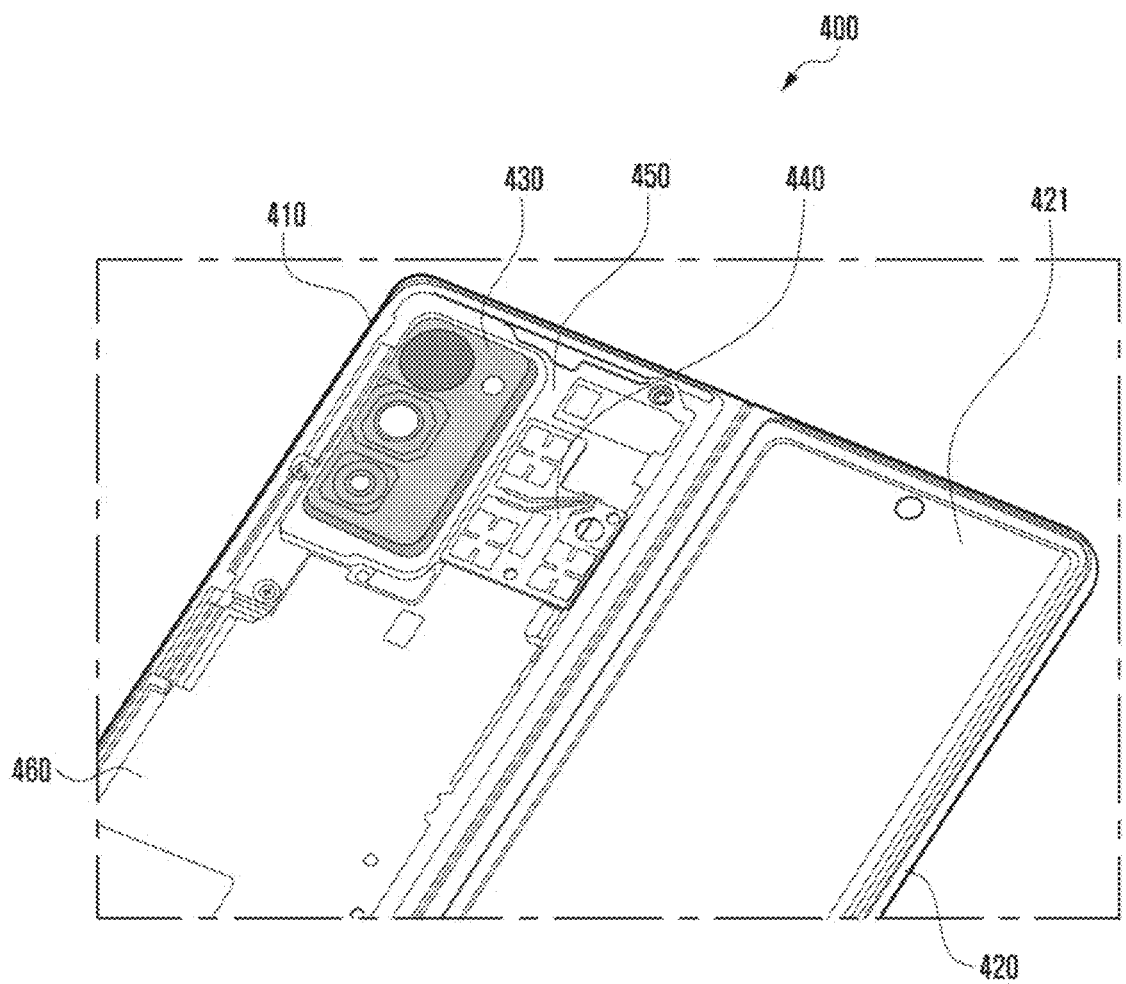

FIGS. 4A and 4B illustrate disposition of a UWB antenna in a portable electronic device 400 having an in-folding scheme foldable housing structure according to an embodiment. Referring to FIGS. 4A and 4B, the portable electronic device 400 may include a foldable housing 410 and 420, and may include a camera cover 430, a UWB antenna 440, and/or a support member 450. The foldable housing may include a first housing 410 and a second housing 420. The first housing 410 may include a first rear cover forming a part of a rear surface of the portable electronic device 400. The second housing 420 may include a second rear cover 421 forming another part of the rear surface of the portable electronic device 400. In an embodiment, the UWB antenna 440 and/or the support member 450 may be arranged inside the first housing 410. In an embodiment, the camera cover 430 may decorate, as a cover of a camera module received inside the first housing 410, the camera module, and may be implemented as metal or polymer.

According to an embodiment, the UWB antenna 440 (e.g., the UWB antenna 260 of FIG. 2) may be disposed inside the first housing 410 while not overlapping with a camera module (e.g., the camera module 180 of FIG. 1) when facing the rear surface. The UWB antenna 440 may be electrically disconnected from the camera cover 430, and may be disposed between a first rear cover and the support member 450.

According to an embodiment, the support member 450 may be disposed between the UWB antenna 440 and a substrate (e.g., a PCB) disposed inside the first housing 410. The support member 450 may be coupled to the UWB antenna 440, and may be implemented as an injection molding. The UWB antenna 440 may be electrically connected to a UWB communication circuit (e.g., the UWB communication circuit 220 of FIG. 2) through a signal line formed on the substrate.

According to an embodiment, an antenna other than the UWB antenna 440, for example, antenna 460 for NFC and/or MST, may be disposed inside the first housing 410. In an embodiment, the portable electronic device 400 may further include a second display disposed inside the second housing 420 and exposed through the second rear cover 421, in addition to a first display exposed through a front surface.

Figure 5:
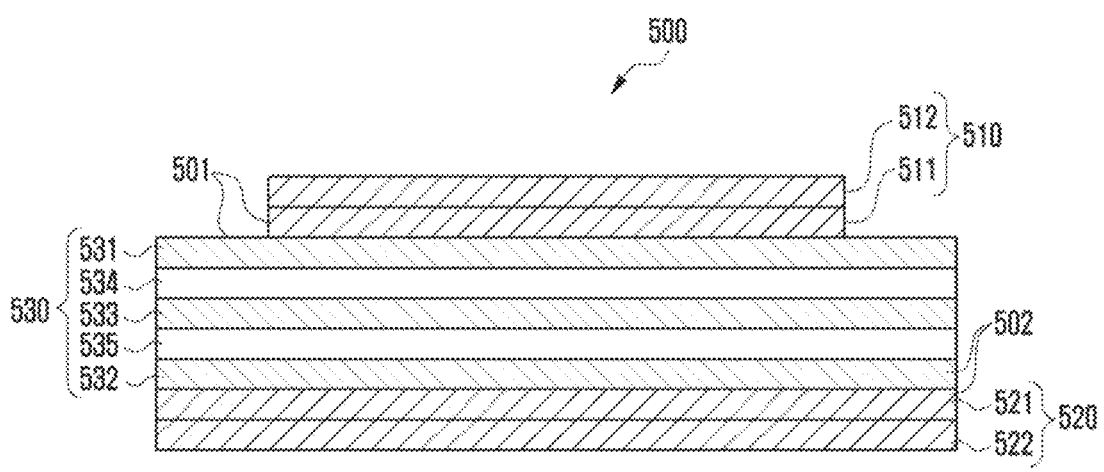
FIG. 5 illustrates a side surface of a UWB antenna having a laminating structure according to various embodiments.

FIG. 5 illustrates a side surface of a UWB antenna 500 having a laminated structure according to various embodiments. Referring to FIG. 5, a UWB antenna 500 (e.g., the UWB antenna 260 of FIG. 2) may be implemented as a two-layer structure FPCB including a first conductive layer (or a top conductive layer) 510 and a second conductive layer (e.g., a bottom conductive layer) 520. The first conductive layer 510 may be formed on one surface of a dielectric substrate (or a dielectric layer) 530, and the second conductive layer 520 may be formed on the other surface of the dielectric substrate 530.

According to an embodiment, the first conductive layer 510 may include patch antennas and a transmission line (or a feeding line) for connecting each of the patch antennas to a UWB communication circuit (e.g., the UWB communication circuit 220 of FIG. 2). The second conductive layer 520 may form a common ground for the patch antennas. The patch antennas and the ground may operate as a resonator for transmitting an RF signal of a specific frequency band (e.g., a second frequency band (e.g., ch5 or an about 6.5 GHz band) or a first frequency band (e.g., ch9 or an about 8 GHz band)) to the outside and receiving an RF signal of the specific frequency band. In an embodiment, the first conductive layer 510 may include a first copper layer 511 and/or a first plating layer (e.g., copper plating) 512 plated with the first copper layer. In an embodiment, the second conductive layer 520 may include a second copper layer 521 and a second plating layer (e.g., copper plating) 522 plated with the second copper layer. As another example, an insulation material such as polymer may be disposed on the first conductive layer 510 or the second conductive layer 520.

According to an embodiment, the dielectric substrate 530 may be implemented so that the UWB antenna 500 transmits or receive an RF signal of a specific frequency band. For example, the dielectric substrate 530 may include a first modified polyimide (MPI) 531, a second MPI 532, a third MPI 533, a first bonding sheet 534, and/or a second bonding sheet 535. The first copper layer 511 and the first MPI 531 are main materials of an FPCB, and may form a first flexible copper clad laminate (FCCL) 501. The second copper 521 and the second MPI 532 may form a second FCCL 502. The first bonding sheet 534 may be disposed between the first MPI 531 and the third MPU 533 to bond the first MPI 531 and the third MPI 533. The second bonding sheet 535 may be disposed between the second MPI 532 and the third MPI 533 to bond the second MPI 532 and the third MPI 533. The third MPI 533 may be disposed between the first bonding sheet 534 and the second bonding sheet 535. In determining the thickness of the dielectric substrate 530, radiation efficiency may be considered. For example, as the thickness of the dielectric substrate 530 reduces, radiation efficiency in the specific frequency band may reduce. In an embodiment, the third MPI 533 may be added to the dielectric substrate 530, as a complementary material for complementing the thickness of the dielectric substrate 530. In another example, when the thickness is not required to be complemented, the third MPI 533 and at least one of the first bonding sheet 534 and the second bonding sheet 535 may be omitted from elements of the dielectric substrate 530.

Figure 6A:
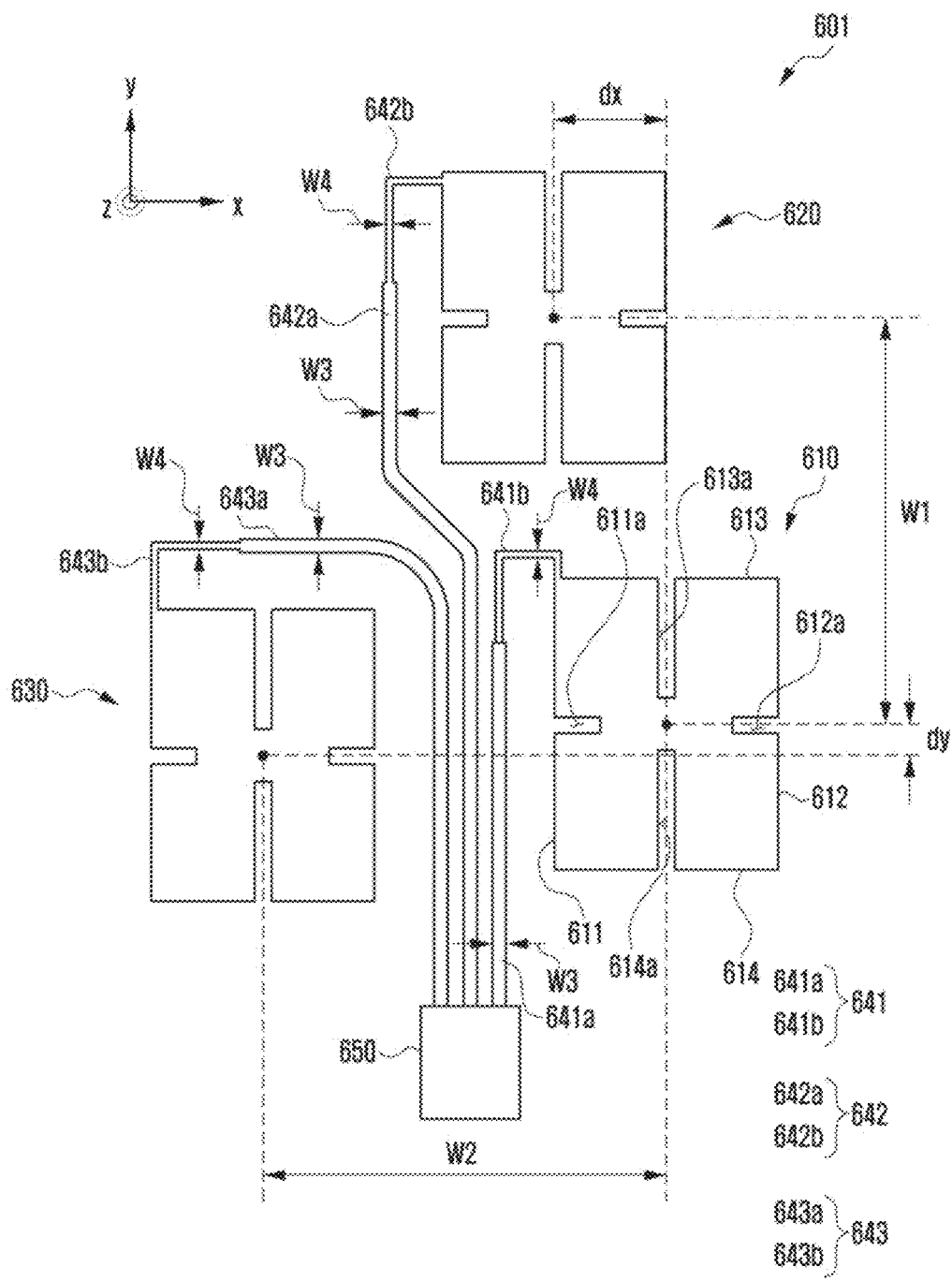
FIG. 6A illustrates a front surface of a first conductive layer of a UWB antenna according to an embodiment.
Figure 6B:
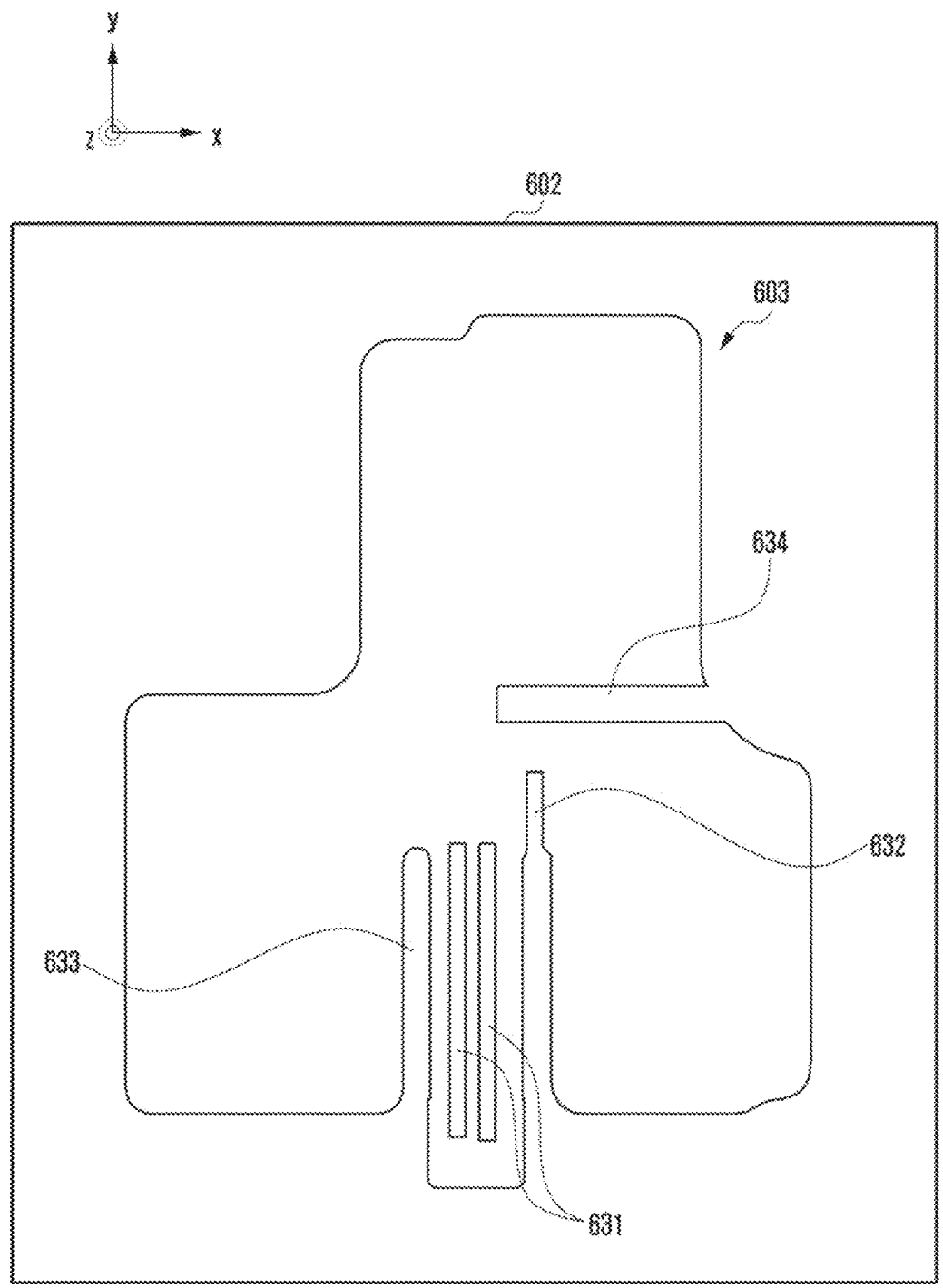
FIG. 6B illustrates a front surface of a second conductive layer disposed under the first conductive layer.
Figure 6C:
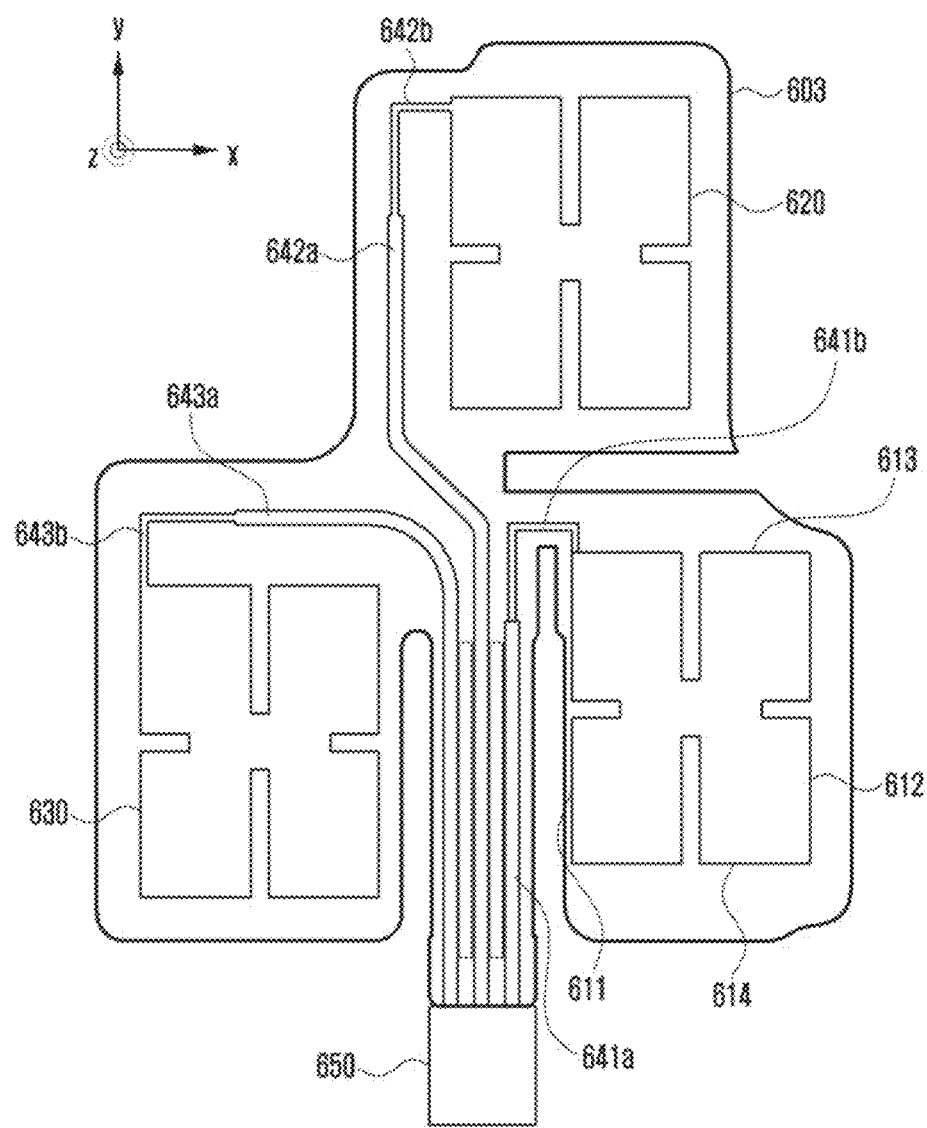
FIG. 6C illustrates a first conductive layer and a second conductive layer aligned side by side.
Figure 6D:
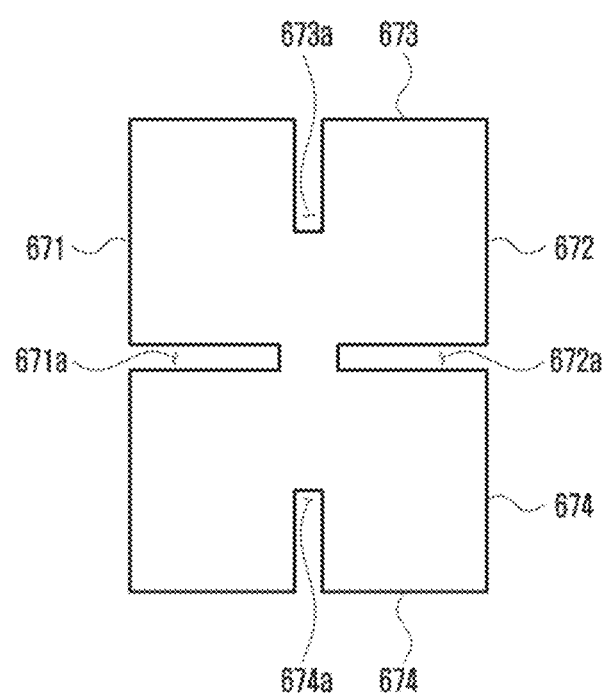
FIGS. 6D, 6E, and 6F illustrate a patch antenna different from the patch antenna illustrated in FIG. 6A.
Figure 6E:
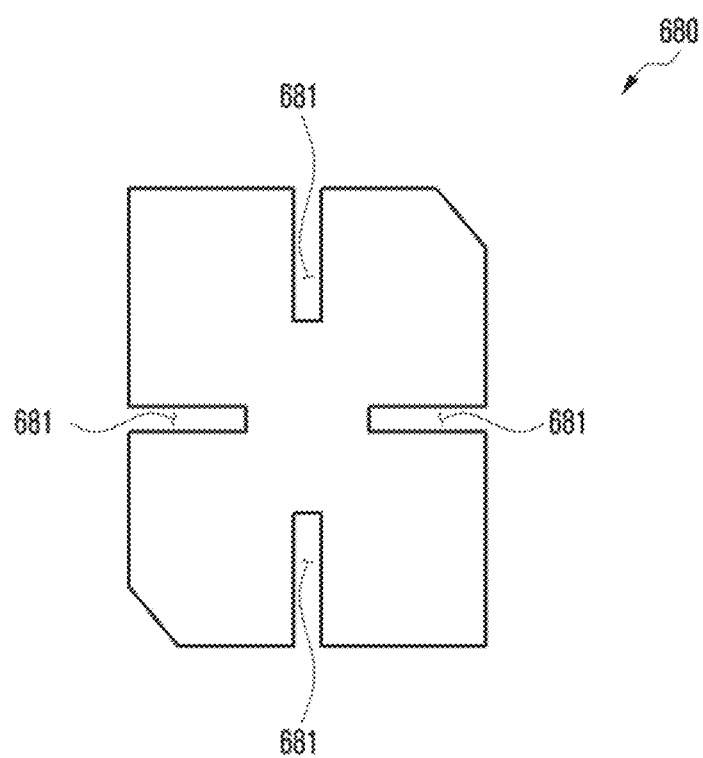
Figure 6F:
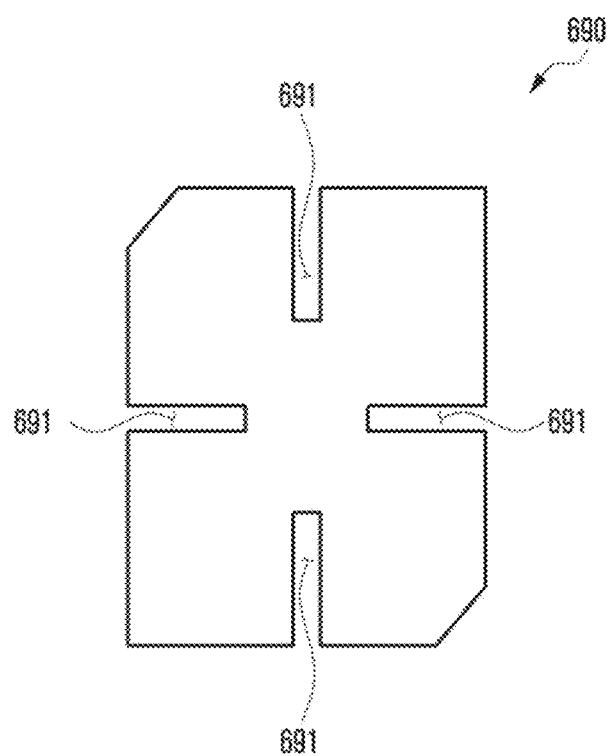
Figure 6G:
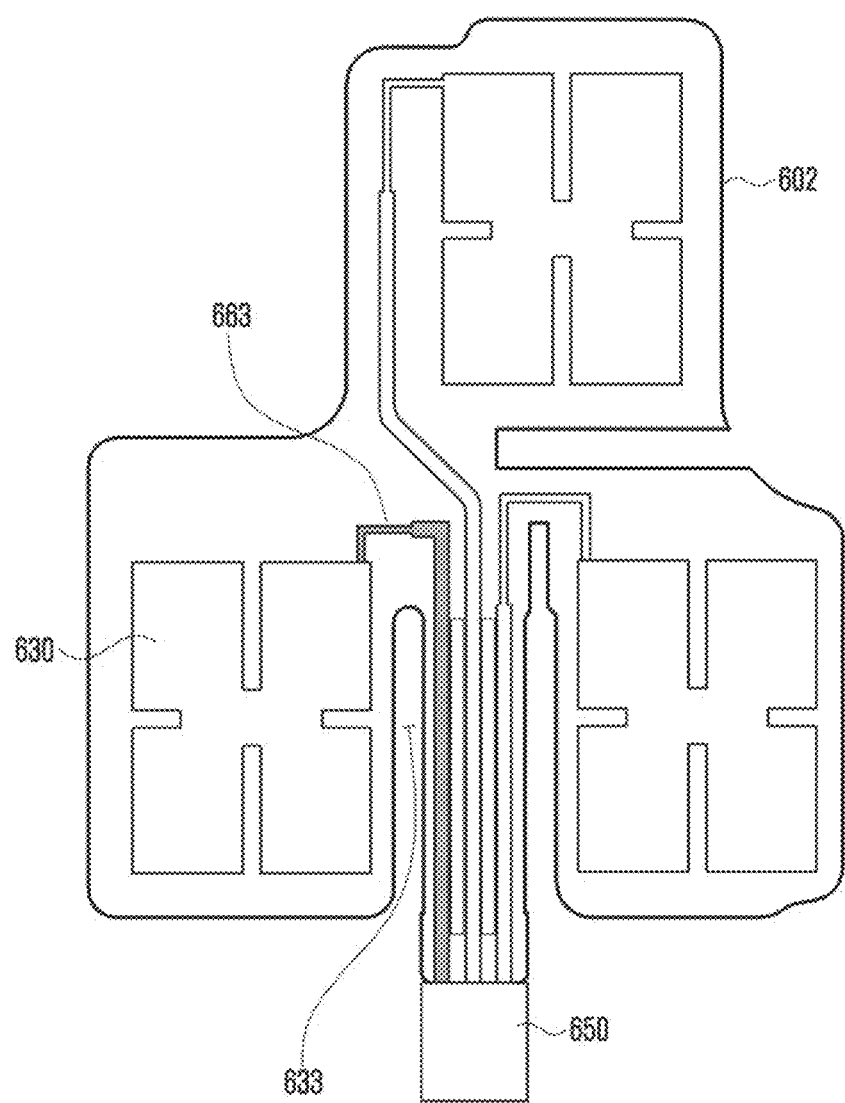
FIGS. 6G and 6H illustrate the position of a feeding point of each patch antenna of a first conductive layer.
Figure 6H:
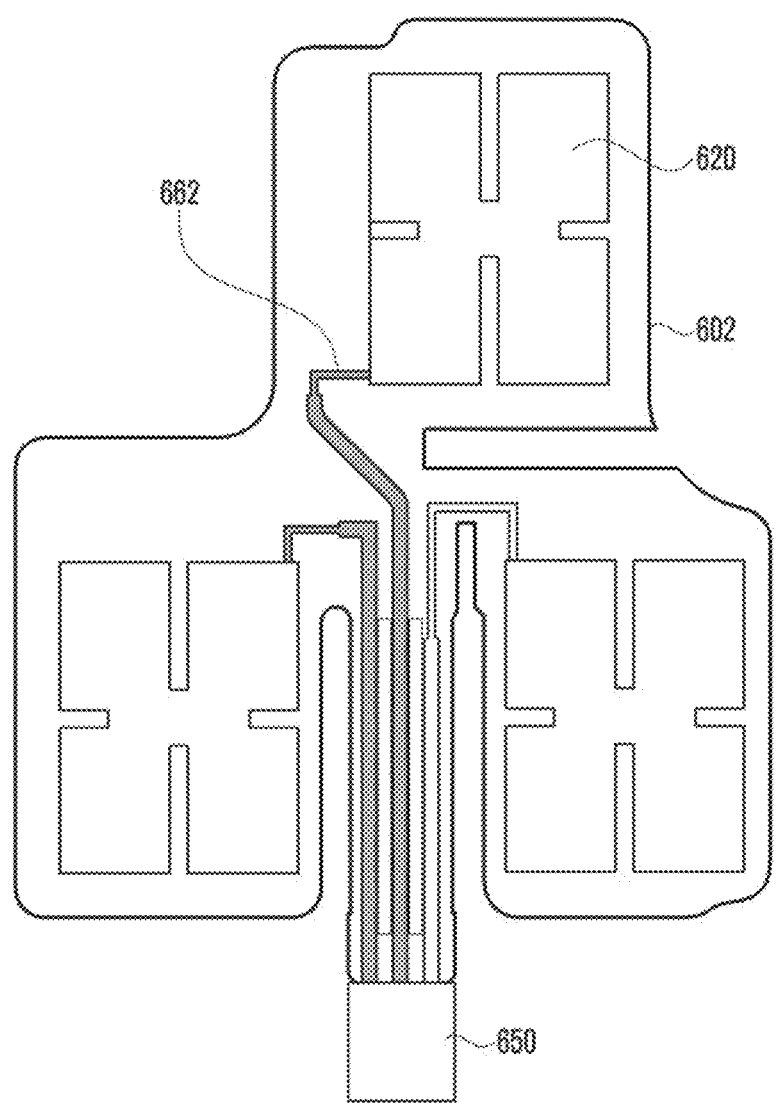

FIG. 6A illustrates a surface of a first conductive layer 601 of a UWB antenna according to an embodiment, FIG. 6B illustrates a surface of a second conductive layer 602 disposed under the first conductive layer 601, and FIG. 6C is a perspective view illustrating a UWB antenna on which the first conductive layer 601 and the second conductive layer 602 are arranged. FIGS. 6D, 6E, and 6F illustrate various embodiments of a patch antenna included in a UWB antenna. FIGS. 6G and 6H illustrate the position of a feeding point of each patch antenna of a first conductive layer 601.

Referring to FIG. 6A, a first conductive layer 601 (e.g., the first conductive layer 510 of FIG. 5) may include a first patch antenna 610, a second patch antenna 620, a third patch antenna 630, a first transmission line 641, a second transmission line 642, and/or a third transmission line 643. In an embodiment, one (e.g., a first patch antenna 610) of the patch antennas 610, 620, and 630 may be used as an antenna for UWB signal transmission or reception, and the other two may be used as antennas for UWB signal reception.

According to an embodiment, the first patch antenna 610 and a second patch antenna 620 may be arranged in a first direction (y-axis direction) while not overlapping with each other when viewed facing a rear surface (XY plane), so that the angle (e.g., an elevation angle of AoA) in the y-axis direction can be measured. For example, the second patch antenna 620 may be disposed to be spaced apart from the first patch antenna 610 in the first direction while not overlapping with the first patch antenna. The second patch antenna 620 may have substantially the same shape and size as the first patch antenna 610. The center of the first patch antenna 610 may be spaced apart from the center of the second patch antenna 620 by an interval (dx) in the x-axis direction. The center of the second patch antenna 620 may be spaced apart from the center of the first patch antenna by an interval (W1) in the y-axis direction.

According to an embodiment, the first patch antenna 610 and a third patch antenna 630 may be aligned in a second direction (x-axis direction) substantially perpendicular to the first direction while not overlapping with each other when viewed facing a rear surface (XY plane), so that the angle (e.g., an azimuth angle of AoA) in the x-axis direction can be measured. For example, the third patch antenna 630 may be disposed to be spaced from the first patch antenna 610 in a third direction (-x-axis direction) while not overlapping with the first patch antenna. The third patch antenna 630 may have substantially the same shape and size as the first patch antenna 610. The center of the third patch antenna 630 may be spaced apart from the center of the first patch antenna 610 by an interval (dy) in the y-axis direction. The center of the third patch antenna 630 may be spaced apart from the center of the first patch antenna 610 by an interval (W2) in the x-axis direction.

According to an embodiment, the interval (W1), the interval (W2), the interval (dx), or the interval (dy) may be determined based on a resonance frequency band of the UWB antenna, and may be determined not to exceed a half-wave length in consideration of characteristics of the AoA. For example, when the resonance frequency band of the UWB antenna is ch5 and ch9, the interval (W1) may be implemented to be about 13 to 20 mm (e.g., about 14 mm), and the interval (dx) may be implemented to be about 3.6 mm. The interval (W2) may be implemented to be about 13 to 20 mm (e.g., about 13 mm), and the interval (dy) may be implemented to be about 1.0 mm.

According to an embodiment, multiple slits may be formed at the patch antennas 610, 620, and 630 so that simultaneous resonance is performed in a dual frequency band, and a vertical linear polarization in which a polarity direction of an electric field is a y-axis direction and a traveling direction of an RF signal is a z-axis direction and a horizontal linear polarization in which a polarity direction of an electric field is an x-axis direction and a traveling direction of an RF signal is a z-axis direction are transmitted and/or received. According to an embodiment, the patch antennas 610, 620, and 630 may be symmetric when viewed with reference to the x-axis and y-axis directions. For example, the shape of each of the patch antennas 610, 620, and 630 may be a rectangle (or a square). The first patch antenna 610 may include a first side (or a left side) 611 extending in the y-axis direction, a second side (or a right side) 612 in parallel to the first side 611, a third side (or a top side) 613 extending in the x-axis direction, and a fourth side (or a bottom side) 614 in parallel to the third side. A first slit 611a may be formed in a straight line from the center of the first side 611 towards the second side 612 so as to be perpendicular to the first side 611. A second slit 612a may be formed in a straight line from the center of the second side 612 towards the first side 611 so as to be perpendicular to the second side 612. A third slit 613a may be formed in a straight line from the center of the third side 613 towards the fourth side 614 so as to be perpendicular to the third side 613. A fourth slit 614a may be formed in a straight line from the center of the fourth side 614 towards the third side 613 so as to be perpendicular to the fourth side 614. A vertical linear polarization of a first frequency band may be transmitted or received by the lengths of electric emission currents of the first side 611, the first slit 611a formed on the first side 611, the second side 612, and the second slit 612a formed on the second side 612. A horizontal linear polarization of a second frequency band may be transmitted or received by the lengths of electric emission currents of the third side 613, the third slit 613a formed on the third side 613, the fourth side 614, and the fourth slit 614a formed on the fourth side 614. In an embodiment, a slit having substantially the same shape as that of the first patch antenna 610 may be also formed at each of the second patch antenna 620 and the third patch antenna 630. For example, slits may be also formed at substantially the same position as the first patch antenna 610.

According to an embodiment, the lengths of the sides and the slits of the first patch antenna 610, the second patch antenna 620, or the third patch antenna 630 may be implemented according to the resonance frequency band. For example, in FIG. 6A, the lengths of the first side 611, the second side 612, the first slit 611a, and the second slit 612a of the first patch antenna 610 may be implemented according to a first frequency band (e.g., ch9 or an about 8 GHz band), and the lengths of the third side 613, the fourth side 614, the third slit 613a, and the fourth slit 614a may be implemented according to a second frequency band (e.g., ch5 or an about 6.5 GHz band). FIG. 6D illustrates that the lengths of a first side 671, a second side 672, a first slit 671a, and a second slit 672a are implemented according to a second frequency band (e.g., ch5 or an about 6.5 GHz band), and the lengths of a third side 673, a fourth side 674, a third slit 673a, and a fourth slit 674a are implemented according to a first frequency band (e.g., ch9 or an about 8 GHz band).

According to an embodiment, when an antenna for transmitting an RF signal has the same polarity direction as an antenna for receiving the RF signal, reception efficiency of the reception antenna may increase. When the polarity directions of the transmission antenna and the reception antennas are not identical, reception efficiency of the reception antenna may decrease. In another example, a patch antenna implemented to receive a circular polarization may have comparatively low reception efficiency compared to a patch antenna implemented to receive a linear polarization, but when the antenna receives not only the circular polarization but also a vertical linear polarization and a horizontal linear polarization, the reception efficiency thereof may increase compared to the patch antenna implemented to receive the linear polarization. In another example, a patch antenna implemented to receive a liner polarization has lower reception efficiency than a case of receiving a linear polarization having the same polarity direction, but when the patch antenna receives a circular polarization, the reception efficiency may increase compared to a case of receiving a linear polarization having a different polarity direction.

According to an embodiment, a patch antenna may be implemented so that resonance is performed in a single frequency band and a circular polarization is transmitted (or received). For example, referring to FIG. 6E, a patch antenna 680 may have the same overall shape as the first patch antenna 610, and may have a structure in which triangles at a right upper corner and a left lower corner are cut off with reference to the currently illustrated drawing so that a right-hand circular polarization (RHCP) is transmitted or received. The shapes of slits 681 formed at the patch antenna 680 may be formed based on a frequency (e.g., a first frequency band (e.g., ch9 or an about 8 GHz band)) supported by the patch antenna 680. Referring to FIG. 6F, a patch antenna 690 may have the same overall shape as the first patch antenna 610, and may have a structure in which triangles at a right lower corner and a left upper corner are cut off with reference to the currently illustrated drawing so that a left-hand circular polarization (LHCP) is transmitted or received. The shapes of slits 691 formed at the patch antenna 690 may be formed based on a frequency (e.g., a first frequency band (e.g., ch9 or an about 8 GHz band)) supported by the patch antenna 690.

Referring to FIG. 6B, a second conductive layer 602 (e.g., the second conductive layer 320 of FIG. 3) according to an embodiment may include a ground pattern 603. Referring to FIGS. 6B and 6C, the ground pattern 603 may be disposed on a substrate (e.g., the dielectric substrate 530 of FIG. 5) to overlap with the first conductive layer 601 when viewed facing a rear surface (XY plane). For example, when viewed in the +z-axis direction, the patch antennas 610, 620, and 630 or the transmission lines 641, 642, and 643 included in the first conductive layer 601 may overlap with the ground pattern 603. In another example, when viewed from the −z-axis direction, the patch antennas 610, 620, and 630 or the transmission lines 641, 642, and 643 included in the first conductive layer 601 disposed to overlap with the ground pattern 603 may be hidden by the ground pattern 603. In another example, the area of the ground pattern 603 may be greater than those of the patch antennas 610, 620, and 630 or the transmission lines 641, 642, and 643.

According to an embodiment, the ground pattern 603 may be formed of one metal plate, as a common ground for the patch antennas 610, 620, and 630, and accordingly, may have a comparatively rigid property. Such a rigid property may cause contact failure between the substrate and a connector 650 when an impact is given to an electronic device from the outside, for example. For example, the substrate may have a UWB communication circuit disposed thereon, or may be electrically connected to the UWB communication circuit. In an embodiment, to maintain contact with the substrate, a part of the ground pattern 603, which overlaps with the connector 650 when viewed in the +z-axis direction, may be flexibly implemented. For example, a part of the ground pattern 603, which overlaps with the connector 650, may have a different composition ratio of a conductive material from that of a part not overlapping with the connector 650. In an embodiment, when viewed in the z-axis direction, slits 631 may be formed not to overlap with the transmission lines 641, 642, and 643. In an embodiment, when viewed from the z-axis direction, a slit 632 may be formed along the y-axis direction so as to be positioned between the first transmission line 641 and the first patch antenna 610 and not to overlap with the first transmission line 641 and the first patch antenna 610. In an embodiment, when viewed from the z-axis direction, a slit 633 may be formed along the y-axis direction so as to be positioned between the third transmission line 643 and the third patch antenna 630 and not to overlap with the third transmission line 643 and the third patch antenna 630.

According to an embodiment, a slit for uniformity of a radiation pattern (or a beam pattern) may be formed on the ground pattern 603. The uniformity may be defined as a technical feature which causes left and right radiation patterns to have symmetry with reference to a designated direction (e.g., y-axis direction). For example, when viewed from the z-axis direction, a slit 634 may be formed along the x-axis direction at the edge of the ground pattern 603 so as to be positioned between the first patch antenna 610 and the second patch antenna 620 and not to overlap with the first patch antenna 610 and the second patch antenna 620.

According to an embodiment, the locations of feeding points of the patch antennas 610, 620, and 630 connected to transmission lines are corners (or vertices) of the respective patch antennas. Referring to FIG. 6A, all the patch antennas 610, 620, and 630 may have substantially the same feeding point at the left upper corner with reference to the currently illustrated drawing. In another example, a feeding point may be positioned at a corner causing a shortest signal path to be formed between the connector 650 and the patch antenna, among four corners of the patch antenna.

According to an embodiment, as the position of the feeding point changes, the length of the transmission line may change. For example, referring to FIG. 6G, when the right upper corner of the third patch antenna 630 is a feeding point in a state in which the slit 633 is formed between the third patch antenna 630 and the connector 650, a third transmission line 663 shorter than the third transmission line 643 of FIG. 6C may be formed on the first conductive layer 601. In another example, when the ground pattern 603 is implemented without the slit 633 and the right lower corner of the third patch antenna 630 is a feeding point, a third transmission line shorter than the third transmission line 663 of FIG. 6G may be formed on the first conductive layer 601. Referring to FIG. 6H, when the left lower corner of the second patch antenna 620 is a feeding point, a second transmission line 662 shorter than the second transmission line 642 of FIG. 6C may be formed on the first conductive layer 601. As the length of the transmission line is reduced, a loss of the UWB signal in the transmission line may become comparatively small, and accordingly, radiation efficiency of a patch antenna can be enhanced. According to an embodiment, the first conductive layer 601 may be selectively implemented through the change of the length of the transmission line, and AoA calculation may be applied through calibration of a phase difference according to the change of the length of the transmission line.

According to an embodiment, the transmission lines 641, 642, and 643 may extend from the connector 650 to the corner of each of the patch antennas by passing between the first patch antenna 610 and the third patch antenna 630 while not overlapping with one another when viewed facing a rear surface (XY plane). The transmission lines 641, 642, and 643 may include first parts 641a, 642a, and 643a each having a first width (W3), and second parts 641b, 642b, and 643b each having a second width (W4). In an embodiment, the first width (W3) may be implemented so that the first parts 641a, 642a, and 643a have, for example, characteristic impedance of 50 ohms. For example, the width of each of the first parts 641a, 642a, and 643a may be implemented to be about 0.5 mm. In an embodiment, the second parts 641b, 642b, and 643b may function as a transformer (or a trance) for impedance conversion for matching impedance of each of the patch antennas 610, 620, and 630 and characteristic impedance of each of the first parts 641a, 642a, and 643a. For example, the second width (W4) may be implemented to be narrower (e.g., about 0.15 mm) than the first width (W3), and the length of each of the second parts 641b, 642b, and 643b may be implemented to be, for example, about 5 mm. In another example, the length of the width (e.g., the second width (W4)) of each of the second parts 641b, 642b, and 643b may be adjusted for impedance matching between the corresponding patch antennas and the first parts 641a, 642a, and 643a. According to an embodiment, the connector 650 may be electrically connected to a UWB communication circuit. For example, the connector 650 may be electrically connected to a UWB communication circuit disposed on a substrate electrically connected to the connector 650.

Figure 7A:
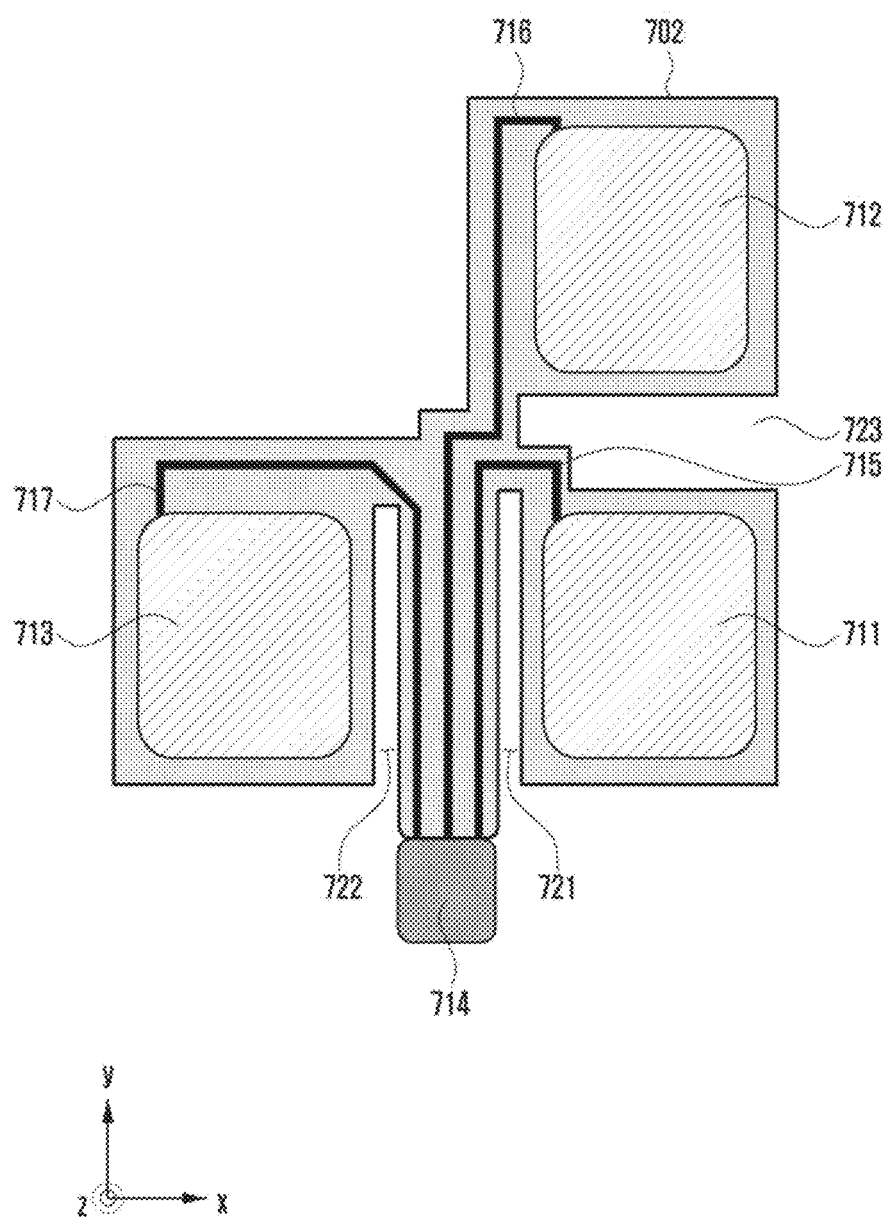
FIGS. 7A, 7B, and 7C illustrate a first conductive layer and a second conductive layer of a UWB antenna according to various embodiments.
Figure 7B:
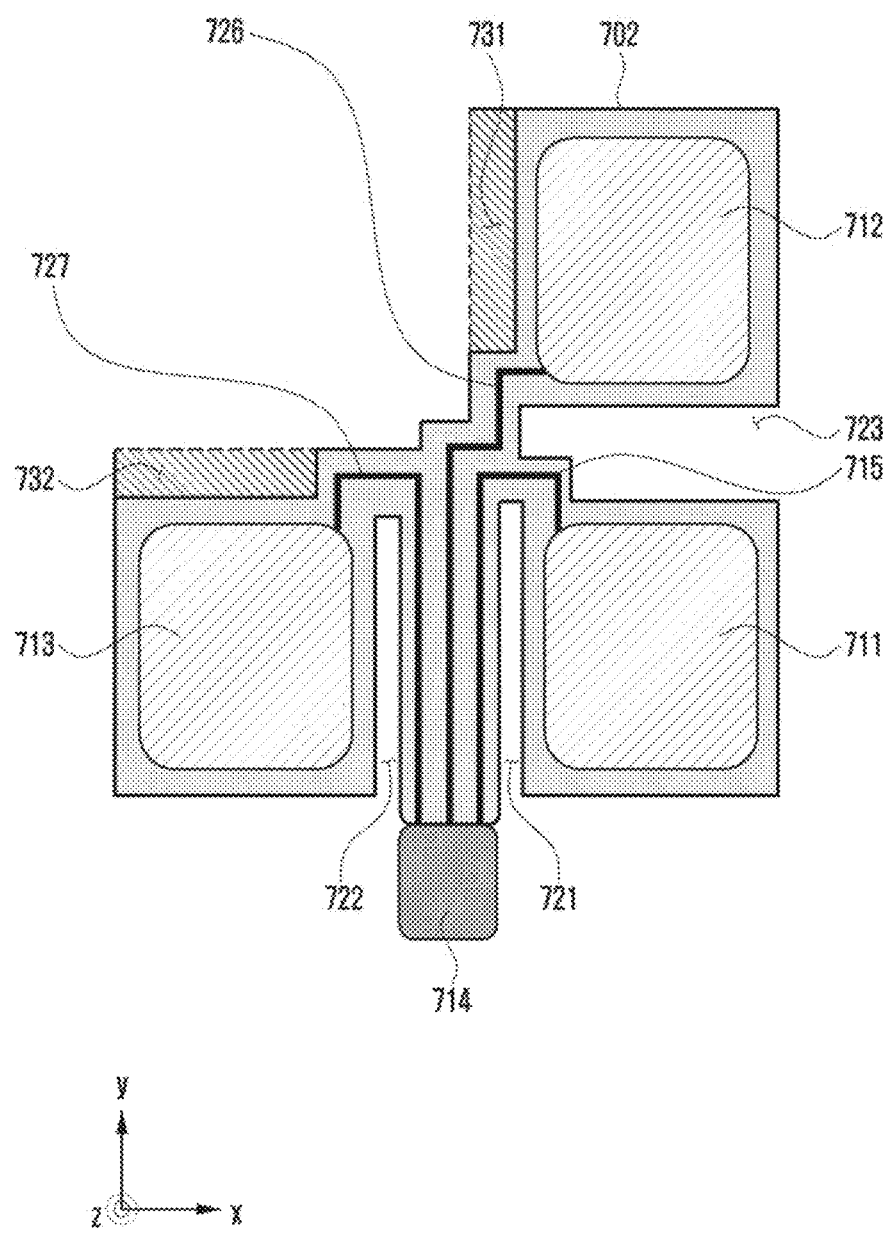
Figure 7C:
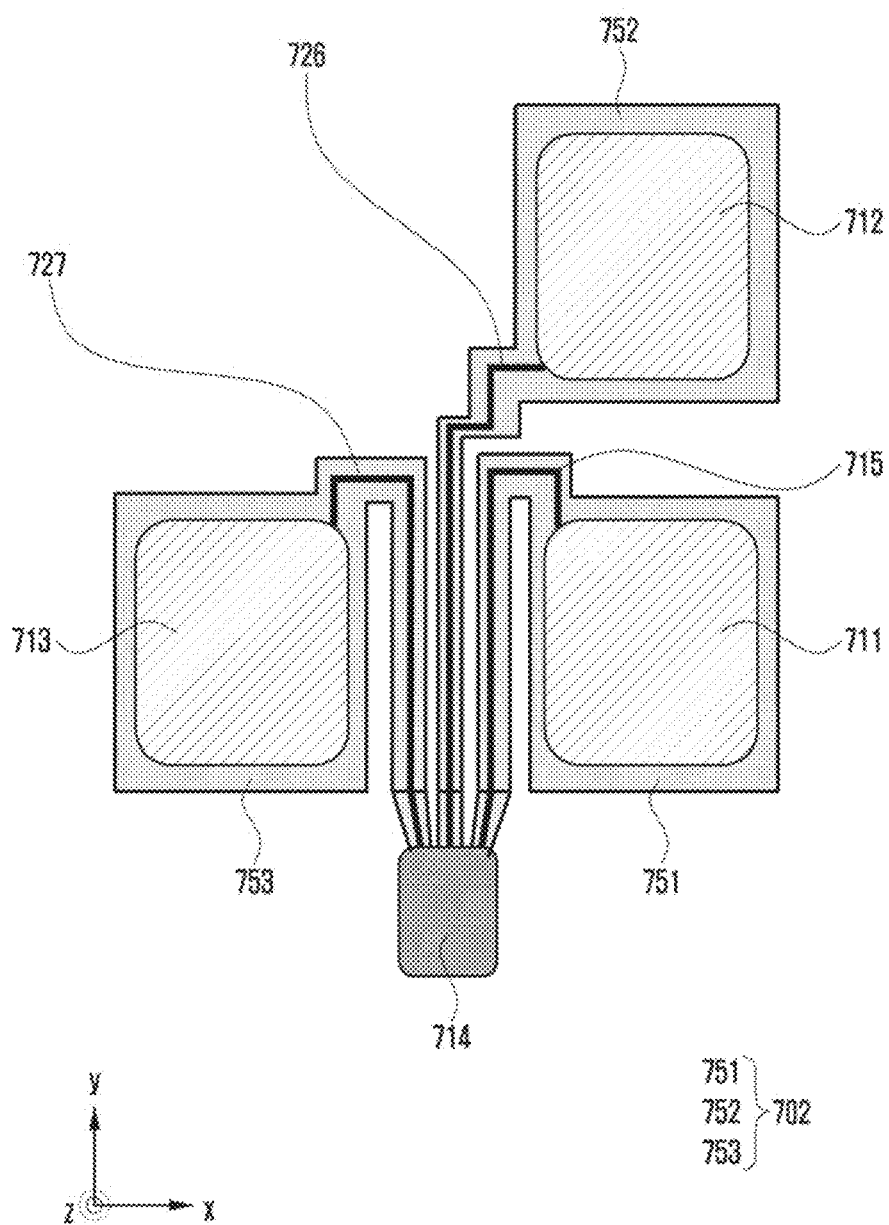

FIGS. 7A, 7B, and 7C illustrate a first conductive layer and a second conductive layer of a UWB antenna according to various embodiments.

Referring to FIG. 7A, patch antennas 711, 712, and 713 (e.g., the patch antennas 610, 620, and 630 of FIG. 6A) may be arranged in a reversed-L shape on a first conductive layer (e.g., the first conductive layer 510 of FIG. 5) as shown in FIG. 7A. For example, a second patch antenna 712 may be disposed in the y-axis direction of a first patch antenna 711, a third patch antenna 713 may be disposed in the −x-axis direction of the first patch antenna 711. The center of the first patch antenna 711 and the center of the second patch antenna 712 may be aligned in a row along the y-axis without misalignment (dx=0). The center of the first patch antenna 711 and the center of the third patch antenna 713 may be aligned in a row along the x-axis without misalignment (dy=0).

A connector 714 may be disposed in the −y-axis direction of the first patch antenna 711 and the third patch antenna 713.

Transmission lines 715, 716, and 717 (e.g., the transmission lines 641, 642, and 643 of FIG. 6A) may be formed on the first conductive layer like the patch antennas 711, 712, and 713. In an embodiment, the transmission lines 715, 716, and 717 may be connected to feeding points at substantially the same positions of the corresponding patch antennas 711, 712, and 713, respectively. For example, with reference to the currently illustrated drawing, the first transmission line 715 may extend from the connector 714 to the left upper corner of the first patch antenna 711 by passing between the first patch antenna 711 and the third patch antenna 713. For example, with reference to the currently illustrated drawing, the second transmission line 716 may extend from the connector 714 to the left upper corner of the second patch antenna 712 by passing between the first patch antenna 711 and the third patch antenna 713. For example, with reference to the currently illustrated drawing, the third transmission line 717 may extend from the connector 714 to the left upper corner of the third patch antenna 713 by passing between the first patch antenna 711 and the third patch antenna 713.

In an embodiment, a second conductive layer may be positioned under the first conductive layer in the −z-axis direction. The second conductive layer (e.g., the second conductive layer 520 of FIG. 5) may include a common ground pattern 702 (e.g., the ground pattern 603 of FIG. 6B) for the patch antennas 711, 712, and 713. When viewing the ground pattern 702 in the z-axis direction, the ground pattern may be disposed to overlap with both the patch antennas 711, 712, and 713 and the transmission lines 715, 716, and 717. For example, when viewed from the z-axis direction, there is no part in which the patch antennas 711, 712, and 713 and the transmission lines 715, 716, and 717 fall outside the ground pattern 702.

A slit 721 may be formed at the edge of the ground pattern 702 positioned between the first transmission line 715 and the first patch antenna 711 along an extension direction (y-axis direction) of the first transmission line 715.

A slit 722 may be formed at the edge of the ground pattern 702 positioned between the third transmission line 717 and the third patch antenna 713 along an extension direction (y-axis direction) of the third transmission line 717.

A slit 723 may be formed at the edge of the ground pattern 702 positioned between the first patch antenna 711 and the second patch antenna 712 along the x-axis direction.

Referring to FIG. 7B, with reference to the currently illustrated drawing, the second transmission line 726 may extend from the connector 714 to the right lower corner of the second patch antenna 712 by passing between the first patch antenna 711 and the third patch antenna 713. Accordingly, the second transmission line 726 may be shortened compared to the second transmission line 716 of FIG. 7A. A part 731 through which the transmission line 716 passes in FIG. 7A in the ground pattern 702 may be removed from the ground pattern 702 by the shortened length of the transmission line. With reference to the currently illustrated drawing, the third transmission line 727 may extend from the connector 714 to the right upper corner of the third patch antenna 713 by passing between the first patch antenna 711 and the third patch antenna 713. Accordingly, the third transmission line 727 may be shortened compared to the third transmission 717 of FIG. 7A. A part 732 through which the third transmission line 717 of FIG. 7A passes in the second conductive layer may be removed from the ground pattern 702 by the shortened length of the transmission line.

Referring to FIG. 7C, the ground pattern 702 may be formed to be physically separated as a first metal plate 751, a second metal plate 752, and a third metal plate 753. When facing the ground pattern 702, the first metal plate 751 may be disposed to overlap with the first patch antenna 711 and the first transmission line 715, the second metal plate 752 may be disposed to overlap with the second patch antenna 712 and the second transmission line 726, and the third metal plate 753 may be disposed to overlap with the third patch antenna 713 and the third transmission line 727.

Figure 8A:
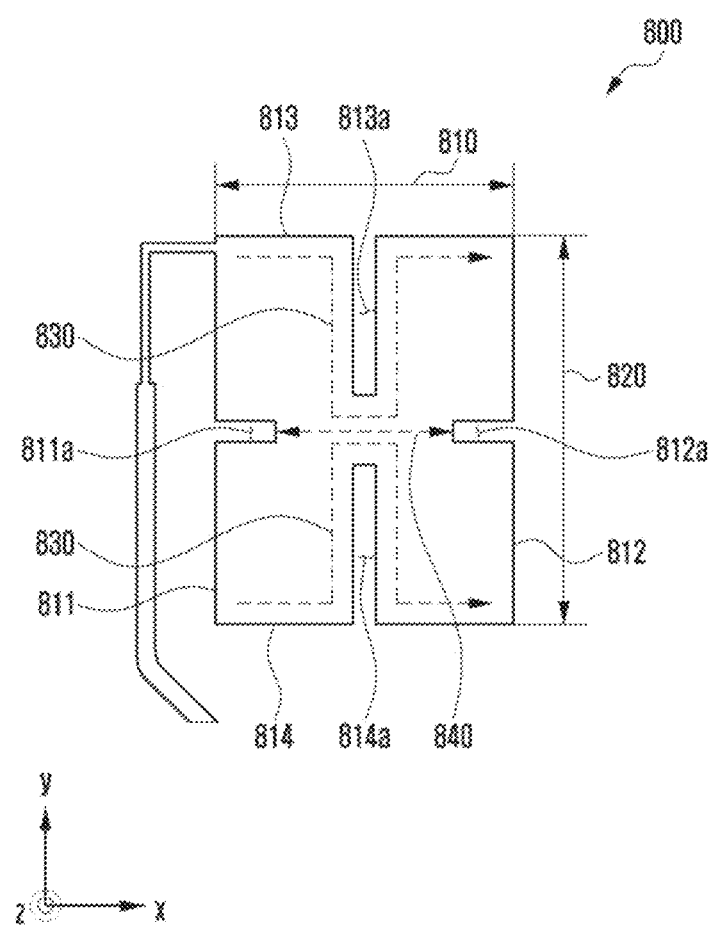
FIG. 8A illustrates a horizontal linear polarization in a patch antenna according to an embodiment.
Figure 8B:
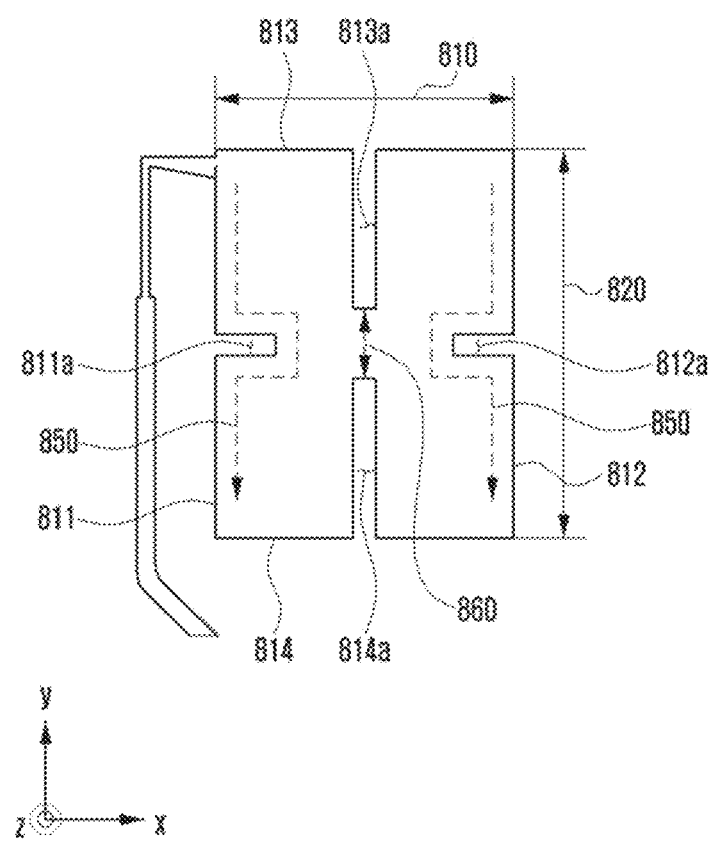
FIG. 8B illustrates a vertical linear polarization in the patch antenna of FIG. 8A.
Figure 8C:
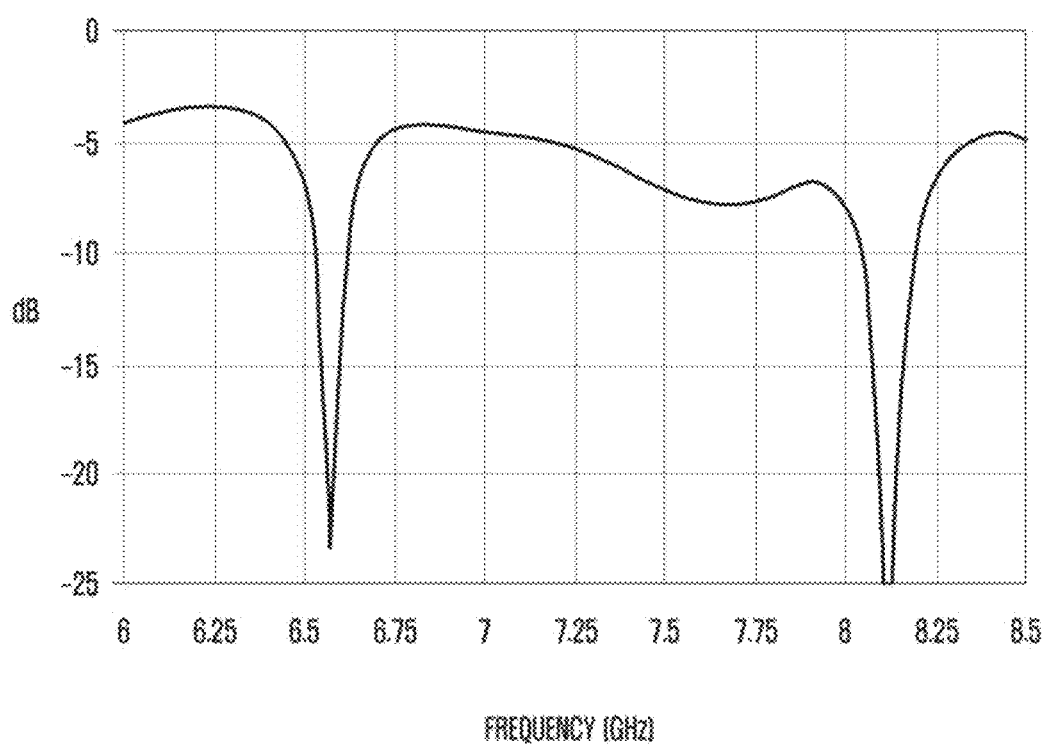
FIG. 8C illustrates characteristics of dual resonance in the patch antenna of FIG. 8A.

FIG. 8A illustrates a horizontal linear polarization in a patch antenna according to an embodiment, FIG. 8B illustrates a vertical linear polarization in the patch antenna of FIG. 8A, and FIG. 8C illustrates characteristics of dual resonance in the patch antenna of FIG. 8A.

Referring to FIG. 8A, in a patch antenna 800 (e.g., the first patch antenna 610 of FIG. 6A), a resonance frequency may be determined by a horizontal length 810 and a vertical length 820. Dual resonance may be implemented in the patch antenna 800 by slits positioned at the edge. For example, as described above with reference to FIG. 6A, a first slit 811a may be formed at a first side 811 and a second slit 812a may be formed at a second side 812 so that the patch antenna 800 resonates in a first frequency band (e.g., ch9 or an about 8 GHz band). A third slit 813a may be formed at a third side 813 and a fourth slit 814a may be formed at a fourth side 814 so that the patch antenna 800 resonates in a second frequency band (e.g., ch5 or an about 6.5 GHz band).

Referring to FIGS. 8A and 8C, the third slit 813a and the fourth slit 814a formed in the vertical direction may form a surface current path 830 corresponding to the second frequency band. As such a surface current path 830 is formed, the patch antenna 800 may transmit and/or receive a horizontal linear polarization of the second frequency band, in which a polarity direction 840 of an electric field is a horizontal direction (x-axis direction) and a traveling direction is the z-axis direction.

Referring to FIGS. 8B and 8C, the first slit 811a and the second slit 812a formed in the horizontal direction may form a surface current path 850 corresponding to the first frequency band. As such a surface current path 850 is formed, the patch antenna 800 may transmit and/or receive a vertical linear polarization of the first frequency band, in which a polarity direction 860 of an electric field is a vertical direction (y-axis direction) and a traveling direction is a z-axis direction.

According an embodiment, the lengths of the first slit 811*a* and the second slit 812*a* may be implemented to cause the patch antenna 800 to transmit and/or receive a vertical linear polarization of a second frequency band (e.g., ch5 or an about 6.5 GHz band), and the lengths of the third slit 813*a* and the fourth slit 814*a* may be implemented to cause the patch antenna 800 to transmit and/or receive a horizontal polarization of a first frequency band (e.g., ch9 or an about 8 GHz band). For example, the lengths of the first slit 811*a* and the second slit 812*a* may be shorter than the lengths illustrated in FIG. 8A, and the lengths of the third slit 813*a* and the fourth slit 814*a* may be longer than the lengths illustrated in FIG. 8A.

Figure 9A:
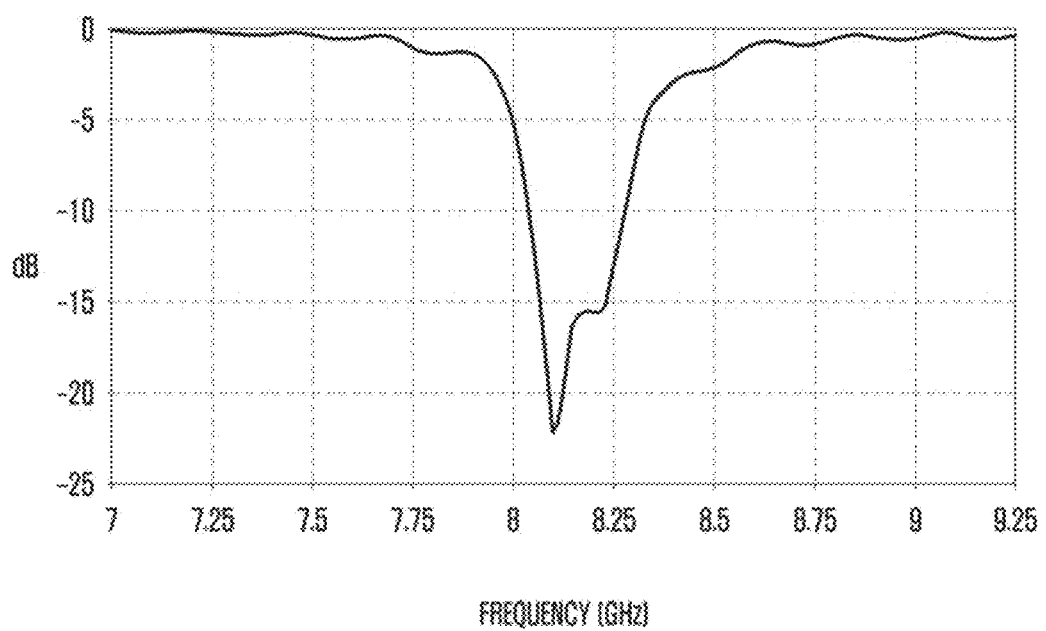
FIG. 9A illustrates a resonance frequency of the patch antenna of FIG. 6E.
Figure 9B:
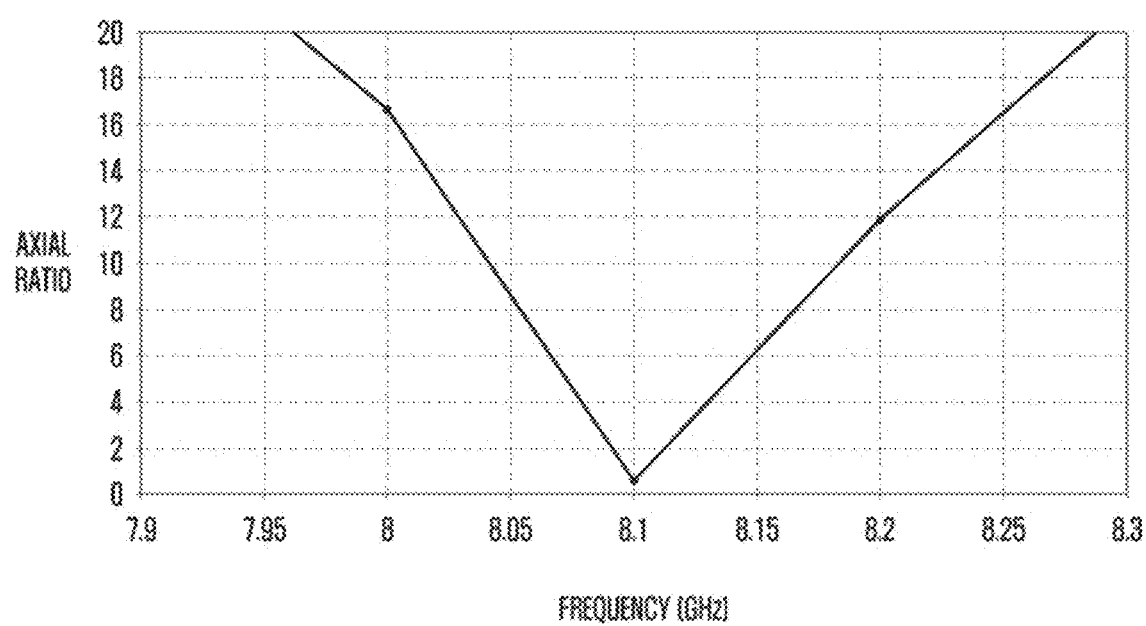
FIG. 9B is a graph indicating an axial ratio of a circular polarization in the patch antenna of FIG. 6E.

FIG. 9A illustrates a resonance frequency of the patch antenna 680 of FIG. 6E, and FIG. 9B is a graph indicating an axial ratio of a circular polarization in the patch antenna 680 of FIG. 6E. Referring to FIG. 9A, the patch antenna 680 may be implemented to resonate in, for example, a first frequency band (e.g., ch9 or an about 8 GHz band). The axial ratio may mean a ratio of the polarity of an electric field in the x-axis direction to the polarity of an electric field in the y-axis direction. Referring to FIG. 9B, it may be identified that a polarization having the smallest axial ratio (for example, a polarization closest to a circle) in the first frequency band in which the center frequency thereof is about 8 GHz occurs in the patch antenna 680.

In an embodiment, the lengths of the slits 681 are implemented differently, and thus the resonance frequency of the patch antenna 680 may be, for example, a second frequency band.

Figure 10A:
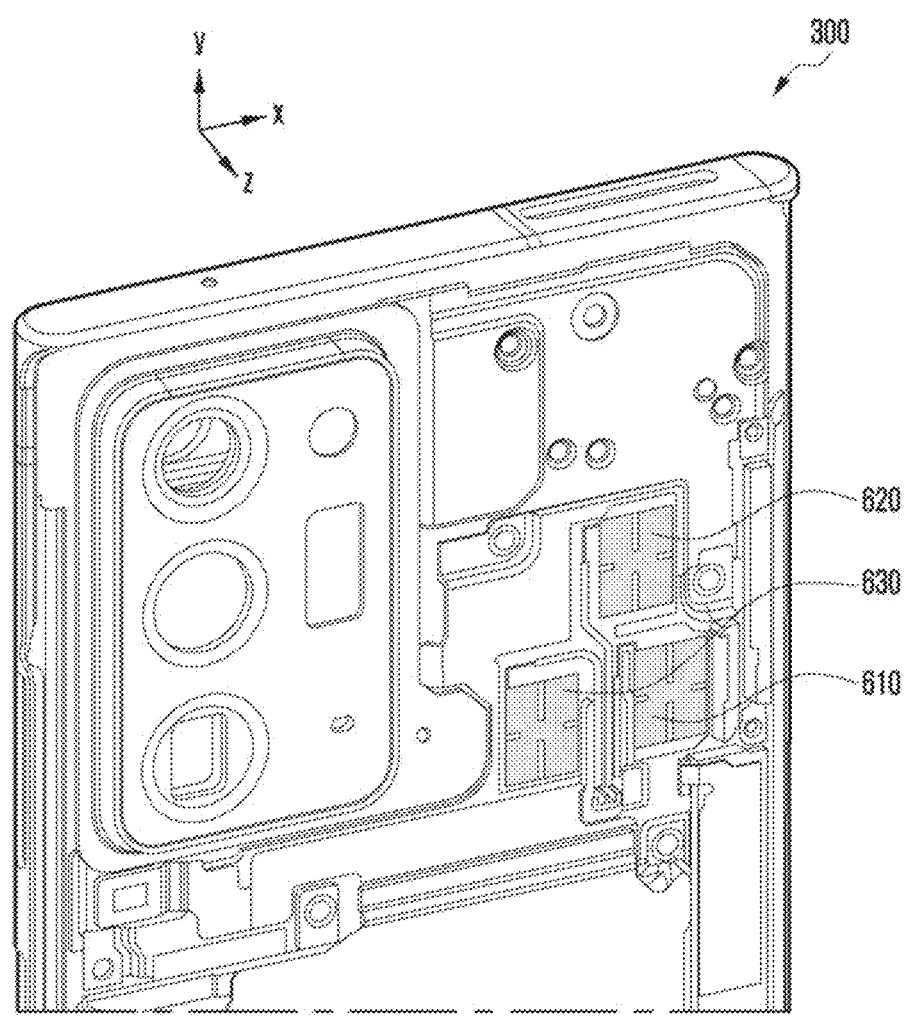
FIGS. 10A and 10B illustrate a radiation pattern when the posture of the portable electronic device of FIG. 3A is a vertical mode (or a portrait mode)
Figure 10B:
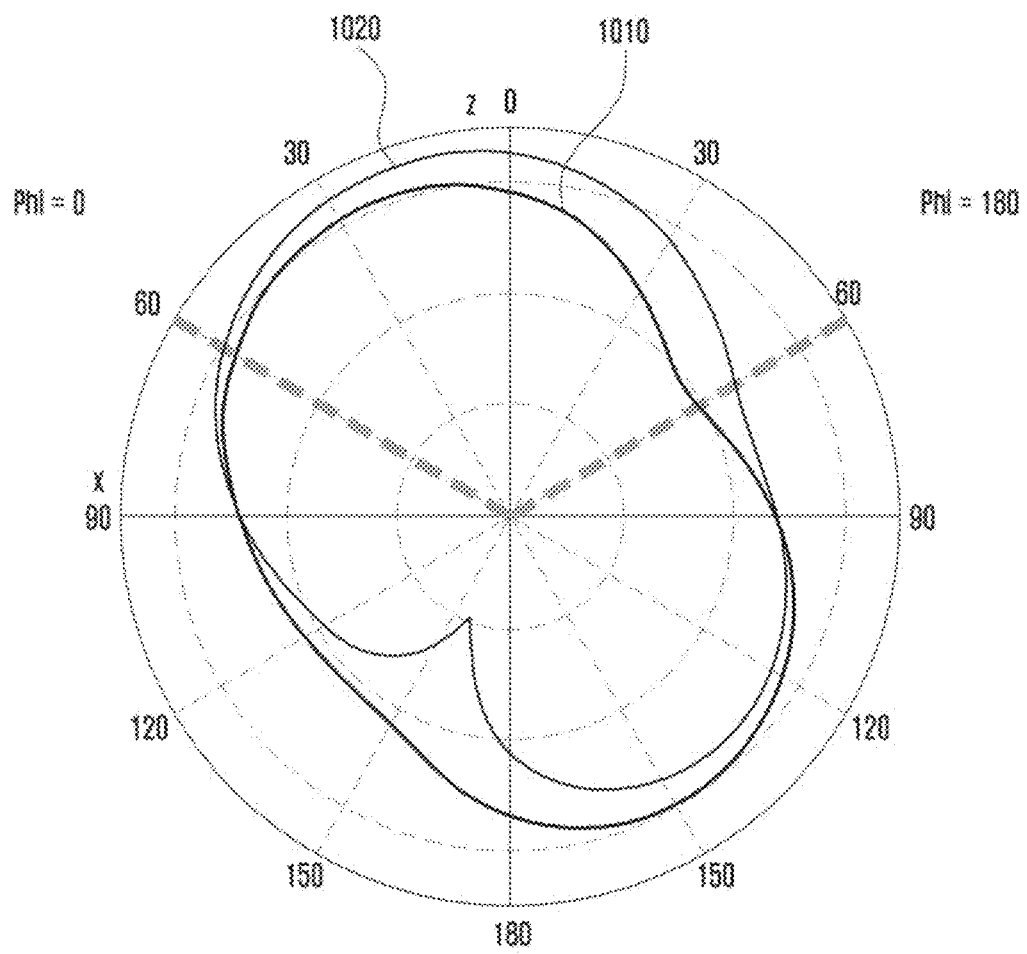
Figure 10C:
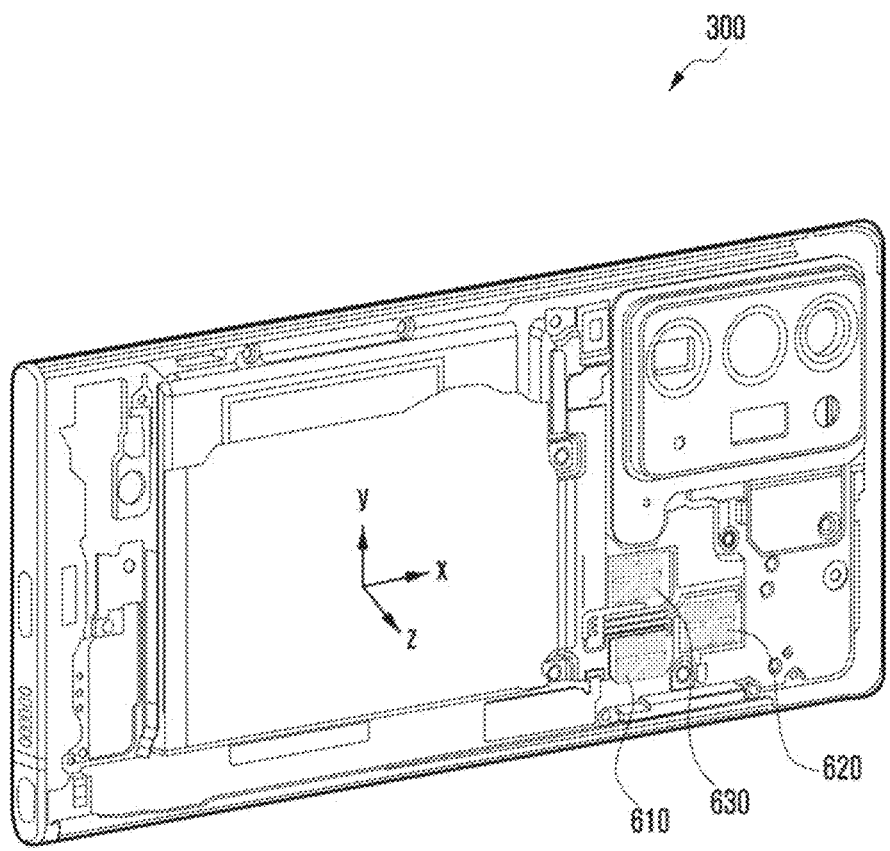
FIGS. 10C and 10D illustrate a radiation pattern when the posture of the portable electronic device of FIG. 3A is a horizontal mode (or a landscape mode)
Figure 10D:
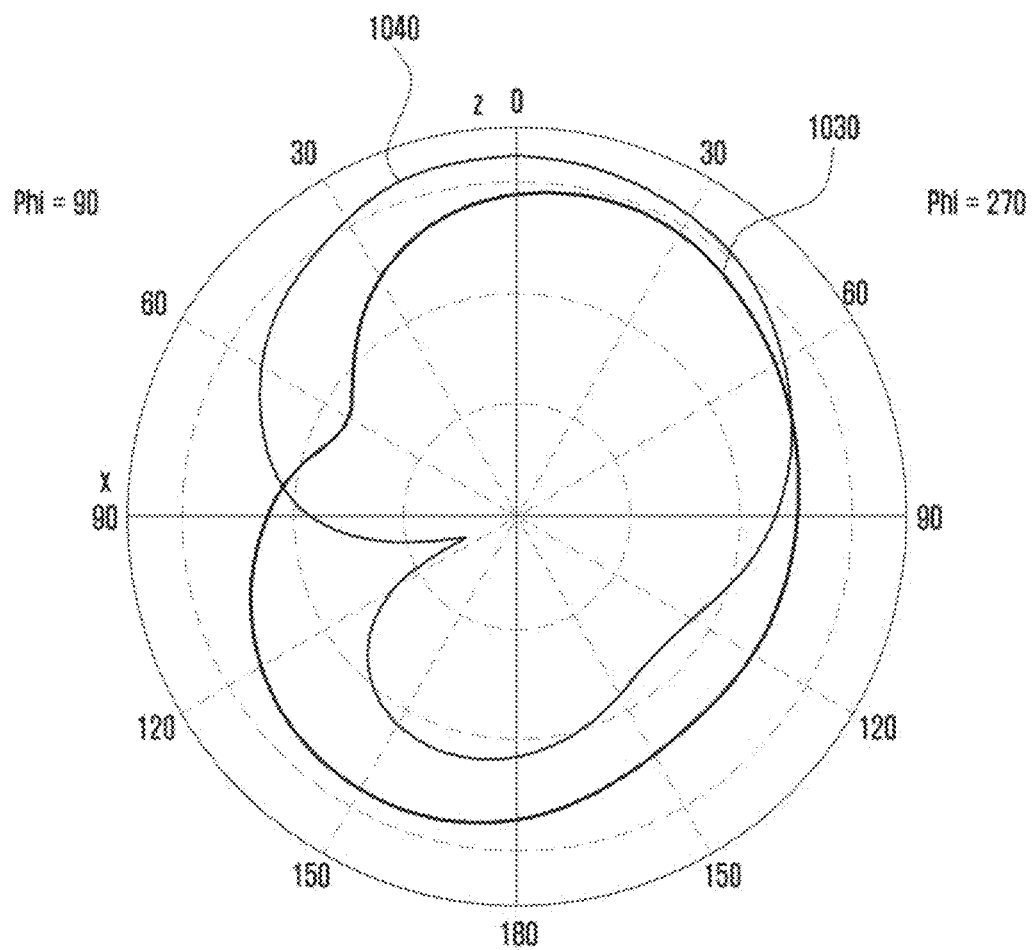

FIGS. 10A and 10B illustrate a radiation pattern when the posture of the portable electronic device 300 of FIG. 3A is a vertical mode (or a portrait mode), and FIGS. 10C and 10D illustrate a radiation pattern when the posture of the portable electronic device 300 of FIG. 3A is a horizontal mode (or a landscape mode).

Referring to FIGS. 10A and 10B, when relatively shorter sides among two pairs of sides are placed in parallel to the x axis in the portable electronic device 300, the first patch antenna 610 and the third patch antenna 630 may be aligned in the direction substantially parallel to the x axis, and the first patch antenna 610 and the second patch antennas 620 may be aligned in the direction substantially parallel to the y axis. Accordingly, when the posture of the portable electronic device 300 is the portrait mode, the first patch antenna 610 and the third patch antenna 630 may be used to measure an angle (an azimuth angle) in the x-axis direction of a UWB signal received in the UWB antenna. The first patch antenna 610 and the second patch antenna 620 may be used to measure an angle (an elevation angle) in the y-axis direction of a UWB signal received in the UWB antenna. For example, a processor (e.g., the processor 120 of FIG. 1) may calculate a phase difference between two signals by using a difference between a reception time of a first signal received from the first patch antenna 610 and a reception time of a second signal received from the second antenna 620, and compute the elevation angle by using the phase difference and the distance (e.g., "interval (W1)" of FIG. 6A) between two patch antennas 610 and 620. The processor may calculate a phase difference between two signals by using a difference between a reception time of the first signal and a reception time of a third signal received from the third antenna 630, and compute the azimuth angle by using the phase difference and the distance (e.g., "interval (W2)" of FIG. 6A) between two patch antennas 610 and 630.

According to an embodiment, in order to mount the UWB antenna in limited spaces inside the portable electronic device 300, a common ground pattern of the patch antennas 610, 620, and 630 may be implemented to have an asymmetric structure rather than a structure (e.g., a square) in which right and left sides and/or top and bottom sides are symmetric to each other. Accordingly, the UWB signal of the UWB antenna may be emitted in an asymmetric shape 1010 when viewed in the z-axis direction on the XY plane. In addition, a null pattern in which no UWB signal is emitted may be generated at a specific angle. As the ground pattern 603 of FIG. 6B having the slit 634 formed thereat is implemented as a common ground for the patch antennas 610, 620, and 630, the UWB signal of the UWB antenna may be emitted, when viewed in the z-axis direction on the XY plane, in a more symmetric shape 1020 than that in a case where the ground pattern has no slit 634 formed thereat. As the radiation pattern is symmetric with reference to the x axis and the null pattern is removed, the AoA operation can be comparatively more accurate.

Referring to FIGS. 10C and 10D, when relatively longer sides among two pairs of sides are placed in parallel to the x axis in the portable electronic device 300, the first patch antenna 610 and the second patch antenna 620 may be aligned in the direction substantially parallel to the x axis, and the first patch antenna 610 and the third patch antennas 630 may be aligned in the direction substantially parallel to the y axis. A common ground pattern of the patch antennas 610, 620, and 630 may be implemented to have an asymmetric structure. Accordingly, the UWB signal of the UWB antenna may be emitted in an asymmetric shape 1030 when viewed in the z-axis direction on the XY plane. As the ground pattern 603 of FIG. 6B having the slit 634 formed thereat is implemented as a common ground for the patch antennas 610, 620, and 630, the UWB signal of the UWB antenna may be emitted in a symmetric shape 1040 when viewed in the z-axis direction on the XY plane.

FIG. 11 illustrates operations 1100 of a processor for positioning according to an embodiment. The operations 1100 may be executed by a processor 120 of an electronic device (e.g., the electronic device 101 of FIG. 1) operating as an initiator searching for an external electronic device (e.g., the electronic device 102 of FIG. 1) (responder). In an embodiment, a memory (e.g., the memory 130 of FIG. 1) may store instructions which, when executed, cause the processor 120 to perform the operations 1100. A UWB antenna having a structure (e.g., the first conductive layer 601 of FIG. 6A) in which a vertical linear polarization of a first frequency band and a horizontal linear polarization of a second frequency band may be received is included in the electronic device, and the processor 120 may perform the operations 1100 by using a UWB signal received from the UWB antenna through a UWB communication circuit (e.g., the UWB communication circuit 220 of FIG. 2). For example, the first frequency band may be one of ch5 (e.g., an about 6.5 GHz band) and ch9 (e.g., an about 8 GHz band), and the second frequency band may be the other of ch9 (e.g., an about 8 GHz band) and ch5 (e.g., an about 6.5 GHz band). The first frequency band and the second frequency band are not limited thereto, and may partially overlap, or may be changed to another bandwidth.

In operation 1110, the processor 120 may transmit, to an external electronic device through a UWB communication circuit, a first request message requesting transmission of a signal for positioning of the external electronic device. In response to the first request message, the external electronic device may transmit a UWB signal of an agreed UWB communication channel, for example, a first frequency band.

In operation 1120, while receiving the UWB signal of the first frequency band from the UWB antenna through the UWB communication circuit, the processor 120 may determine whether a signal received first is a main signal of a second frequency band. For example, the main signal may mean a signal, the strength (e.g., RSSI) of which is the largest, among received signals of a corresponding channel. The first signal arrived at the electronic device is referred to as a line of sight (LOS) signal, and may mean a signal directly arriving at the electronic device without being reflected by a metal object of the external electronic device. A next arriving signal is referred to as a not line of sight (NLOS) signal, and may mean a signal arriving at the electronic device after being reflected by a metal object of the external electronic device. When the signal is reflected by the metal object, a polarization direction of the signal may change.

As a result of the determination made in operation 1120, when an LOS signal of the first frequency band is a main signal of the first frequency band, the processor 120 may perform, in operation 1130, an AoA operation by using the LOS signal of the first frequency band.

As a result of the determination made in operation 1120, when the LOS signal of the first frequency band is not a main signal of the first frequency band, the processor 120 may perform operation 1140. For example, when the polarization direction of the first frequency band in a patch antenna (reception antenna) of the electronic device is not parallel to and is misaligned with the polarization direction of the first frequency band in a patch antenna (transmission antenna) of the external electronic device, the LOS signal may not be the main signal. The NLOS signal received later may be reflected by the metal object, and the polarization direction thereof may be changed to be closer to the polarization direction of the reception antenna. Accordingly, the NLOS signal may be the main signal.

In operation 1140, the processor 120 may transmit, to the external electronic device through the UWB communication circuit, a second request message requesting transmission of a UWB signal of the second frequency band. In response to the second request message, the external electronic device may transmit a UWB signal of the second frequency band.

In operation 1150, while receiving the UWB signal of the second frequency band from the UWB antenna through the UWB communication circuit, the processor 120 may determine whether the LOS signal received first is a main signal.

As a result of the determination made in operation 1150, when the LOS signal of the second frequency band is a main signal of the second frequency band, the processor 120 may perform, in operation 1160, an AoA operation by using the LOS signal of the second frequency band.

As a result of the determination made in operation 1150, when the LOS signal of the second frequency band is not a main signal of the second frequency band, the processor 120 may perform operation 1170.

In operation 1170, the processor 120 may compare a signal strength difference (hereinafter, referred to as a first difference value) between the LOS signal of the first frequency band and the main signal of the first frequency band with a signal strength difference (hereinafter, referred to as a second difference value) between the LOS signal of the second frequency band and the main signal of the second frequency band. As a result of the comparison, when the first difference value is greater than the second difference value, the processor 120 may perform the AoA operation by using the main signal of the first frequency band. As a result of the comparison, when the second difference value is greater than the first difference value, the processor 120 may perform, in operation 1180, the AoA operation by using the main signal of the second frequency band.

In various embodiments, an ultra-wideband (UWB) antenna may include: a dielectric substrate; a first conductive layer disposed on one surface of the dielectric substrate; and a second conductive layer disposed on the other surface of the dielectric substrate. The first conductive layer may include: a first patch antenna having a structure of receiving a first UWB signal of a first frequency band, in which a polarity direction of an electric field is a vertical linear polarization, and a second UWB signal of a second frequency band, in which a polarity direction of an electric field is a horizontal linear polarization; a second patch antenna which is disposed to be spaced apart from the first patch antenna in a first direction (e.g., the y-axis direction in FIG. 6A), and has a structure identical to that of the first patch antenna; a third patch antenna which is disposed to be spaced apart from the first patch antenna in a second direction (e.g., the x-axis direction in FIG. 6A) perpendicular to the first direction, and has a structure identical to that of the first patch antenna; a first transmission line configured to connect a connector and the first patch antenna; a second transmission line configured to connect the connector and the second patch antenna; and a third transmission line configured to connect the connector and the third patch antenna. The second conductive layer may include a ground pattern which overlaps with the first patch antenna, the second patch antenna, the third patch antenna, the first transmission line, the second transmission line, and the third transmission line when facing the second conductive layer in a third direction that is perpendicular to the first direction and the second direction.

A first slit (e.g., 634 of FIG. 6B) may be formed on the second conductive layer, wherein the first slit is inwardly formed at an edge of a part positioned between the first patch antenna and the second patch antenna when facing the second conductive layer in the third direction.

The first transmission line, the second transmission line, and the third transmission line may be formed on an upper surface of the dielectric subtract while not overlapping with one another, wherein the first transmission line extends from the connector to the first patch antenna by passing between the first patch antenna and the third patch antenna. The second transmission line may extend from the connector to the second patch antenna by passing between the first patch antenna and the third patch antenna. The third transmission line may extend from the connector to the third patch antenna by passing between the first patch antenna and the third patch antenna.

A second slit and a third slit may be formed on the second conductive layer, wherein the second slit (e.g., 631 of FIG. 6B) is formed between the first transmission line and the second transmission line and between the second transmission line and the third transmission line. The third slit (e.g., 632 and 633 of FIG. 6B) may be formed between the third patch antenna and the third transmission line and between the first patch antenna and the first transmission line.

Each of the first patch antenna, the second patch antenna, and the third patch antenna may be a quadrangle having a first side and a second side extending in parallel to the first direction, and having a third side and a fourth side extending in parallel to the second direction. A first slit is formed towards an inside of the quadrangle at the first side in parallel to the second direction and a second slit is formed towards an inside of the quadrangle at the second side in parallel to the second direction, so that the first UWB signal can be received in the UWB antenna. A third slit is formed towards an inside of the quadrangle at the third side in parallel to the first direction and a fourth slit is formed towards an inside of the quadrangle at the fourth side in parallel to the first direction, so that the second UWB signal can be received in the UWB antenna.

The lengths of the first slit and the second slit may be implemented so that the UWB antenna resonates in one of UWB communication channels 5 and 9. The lengths of the third slit and the fourth slit may be implemented so that the UWB antenna resonates in the other of UWB communication channels 5 and 9. The channel 5 may be about 6.25 to 6.75 GHz, and the channel 9 may be about 7.75 to 8.25 GHz.

A feeding point may be formed at a corner, for example, a left upper corner of the quadrangle. A feeding point may be formed at a corner causing a shortest signal path from the connector to be formed, among four corners of the quadrangle.

In various embodiments, an ultra-wideband (UWB) antenna may include: a dielectric substrate; a first conductive layer disposed on one surface of the dielectric substrate; and a second conductive layer disposed on the other surface of the dielectric substrate. The first conductive layer may include: a first patch antenna having a structure of receiving a UWB signal in which a polarity direction of an electric field is a circular polarization; a second patch antenna which is disposed to be spaced apart from the first patch antenna in a first direction (e.g., the y-axis direction in FIG. 6A) while not overlapping with the first patch antenna, and has a structure identical to that of the first patch antenna; a third patch antenna which is disposed to be spaced from the first patch antenna in a second direction (e.g., the x-axis direction in FIG. 6A) perpendicular to the first direction while not overlapping with the first patch antenna, and has a structure identical to that of the first patch antenna; a first transmission line configured to connect a connector and the first patch antenna; a second transmission line configured to connect the connector and the second patch antenna; and a third transmission line configured to connect the connector and the third patch antenna. The second conductive layer may include a ground pattern which overlaps with the first patch antenna, the second patch antenna, the third patch antenna, the first transmission line, the second transmission line, and the third transmission line when facing the second conductive layer in a third direction perpendicular to the first direction and the second direction.

Each of the first patch antenna, the second patch antenna, and the third patch antenna may have a structure in which triangles at a first corner and a second corner positioned diagonal to the first corner are cut off from a quadrangle including a first side and a second side extending in parallel to the first direction and a third side and a fourth side extending in parallel to the second direction. A first slit may be formed towards an inside of the quadrangle at the first side in parallel to the second direction. A second slit may be formed towards an inside of the quadrangle at the second side in parallel to the second direction. A third slit may be formed towards an inside of the quadrangle at the third side in parallel to the first direction. A fourth slit may be formed towards an inside of the quadrangle at the fourth side in parallel to the first direction.

The lengths of the first slit, the second slit, the third slit, and the fourth slit may be implemented so that the UWB antenna resonates in one of UWB communication channels 5 and 9. The channel 5 may be about 6.25 to 6.75 GHz, and the channel 9 may be about 7.75 to 8.25 GHz.

In various embodiments, an electronic device may include: an ultra-wideband (UWB) antenna; a processor; and a communication circuit configured to: convert a baseband signal received from the processor into an RF signal of a frequency band designated to be used for UWB communication, and output the same to an UWB antenna; and convert an RF signal received from the UWB antenna into a baseband signal, and output the same to the processor. The UWB antenna may have a structure of receiving a first UWB signal in which a polarity direction of an electric field is a vertical linear polarization and a second UWB signal in which a polarity direction of an electric field is a horizontal linear polarization. The processor may be configured to: while receiving a UWB signal of a first communication channel from an external electronic device through the communication circuit, in case that a signal of the first communication channel received first from the external electronic device is a first signal of the first communication channel, which has a largest signal strength, perform an angle of arrival (AoA) operation by using a main signal of the first communication channel; transmit a message requesting to transmit a UWB signal of a second communication channel, to the external electronic device through the communication circuit in case that the first signal of the first communication channel is not the main signal of the first communication channel; while receiving a UWB signal of the second communication channel from the external electronic device through the communication circuit, in case that a signal of the second communication channel received first from the external electronic device is a main signal of the second communication channel, which has a largest signal strength, perform an AoA operation by using a first signal of the second communication channel; and perform an AoA operation by using the main signal of the first communication channel or the main signal of the second communication channel in case that the first signal of the second communication channel is not the main signal of the second communication channel.

The processor may be configured to: compare a first difference value indicating a strength difference between the first signal of the first communication channel and the main signal of the first communication channel with a second difference value indicating a strength difference between the first signal of the second communication channel and the main signal of the second communication channel; perform an AoA operation by using the main signal of the first communication channel in case that the first difference value is greater than the second difference value; and perform an AoA operation by using the main signal of the second communication channel in case that the second difference value is greater than the first difference value.

The UWB signal of the first communication channel may be one of the first UWB signal and the second UWB signal, and the UWB signal of the second communication channel may be the other of the first UWB signal and the second UWB signal, wherein first communication channel is channel 9 among UWB communication channels, the second communication channel is channel 5 among UWB communication channels, channel 5 is about 6.25 to 6.75 GHz, and channel 9 is about 7.75 to 8.25 GHz.

Embodiments of the disclosure disclosed in the specification and illustrated in the drawings merely suggest specific examples so as to easily explain the technological content according to embodiments of the disclosure and help the understanding of embodiments of the disclosure, and do not intend to limit the scope of the embodiments of the disclosure. Accordingly, it should be understood that, in addition to the embodiments disclosed herein, all modified or changed forms derived based on the technical spirit of various embodiments of the disclosure are included in the scope of various embodiments of the disclosure.

What is claimed:

1. An ultra-wideband (UWB) antenna comprising:
a dielectric substrate comprising a first surface and a second surface;
a first conductive layer on the first surface of the dielectric substrate, the first conductive layer comprising a first patch antenna, a second patch antenna, a third patch antenna, a first transmission line, a second transmission line, a third transmission line, and a connector; and
a second conductive layer on the second surface of the dielectric substrate,
wherein the first patch antenna comprises a structure configured to receive a first UWB signal of a first frequency band in which a polarity direction of an electric field of the first UWB signal is a vertical linear polarization, and a second UWB signal of a second frequency band in which a polarity direction of an electric field of the second UWB signal is a horizontal linear polarization,
wherein the second patch antenna is spaced apart from the first patch antenna in a first direction and comprises a structure identical to the structure of the first patch antenna,
wherein the third patch antenna is spaced apart from the first patch antenna in a second direction perpendicular to the first direction and comprises a structure identical to the structure of the first patch antenna,
wherein the first transmission line is configured to connect the connector and the first patch antenna, the second transmission line is configured to connect the connector and the second patch antenna, and the third transmission line is configured to connect the connector and the third patch antenna, and
wherein the second conductive layer comprises a ground pattern which overlaps with the first patch antenna, the second patch antenna, the third patch antenna, the first transmission line, the second transmission line, and the third transmission line when facing the second conductive layer in a third direction that is perpendicular to the first direction and the second direction.

2. The UWB antenna of claim 1, wherein the second conductive layer further comprises a first slit between the first patch antenna and the second patch antenna when facing the second conductive layer in the third direction.

3. The UWB antenna of claim 1,
wherein the first transmission line, the second transmission line, and the third transmission are each between the first patch antenna and the third patch antenna, and
wherein the first transmission line, the second transmission line, and the third transmission line do not overlap with one another.

4. The UWB antenna of claim 3, wherein the second conductive layer further comprises:
a second slit between the first transmission line and the second transmission line; a third slit disposed between the second transmission line and the third transmission line; a fourth slit between the third patch antenna and the third transmission line; and a fifth slit between the first patch antenna and the first transmission line.

5. The UWB antenna of claim 1, wherein each of the first patch antenna, the second patch antenna, and the third patch antenna comprises a quadrangle having a first side and a second side extending in parallel to the first direction and a third side and a fourth side extending in parallel to the second direction,
wherein each respective first side comprises a first slit formed towards an inside of the quadrangle, wherein each respective first slit is parallel to the second direction,
wherein each respective second side comprises a second slit formed towards an inside of the quadrangle, wherein each respective second slit is parallel to the second direction,
wherein each respective third side comprises a third slit, wherein each respective third slit is parallel to the first direction, and
wherein each respective fourth side comprises a fourth slit, wherein each respective fourth slit is parallel to the first direction.

6. The UWB antenna of claim 5,
wherein each respective first slit and second slit comprises a length configured to cause the UWB antenna to resonate in one of UWB communication channel 5 and UWB communication channel 9,
wherein each respective third slit and fourth slit comprises a length configured to cause the UWB antenna to resonate in a UWB communication channel, from among UWB communication channel 5 and UWB communication channel 9, which each respective first slit and second slit is not configured to cause the UWB antenna to resonate in, and
wherein channel 5 is about 6.25 GHz to 6.75 GHz, and channel 9 is about 7.75 GHz to 8.25 GHz.

7. The UWB antenna of claim 5, wherein each of the first patch antenna, the second patch antenna, and the third patch antenna further comprise a feeding point at a left upper corner of the respective quadrangle when viewed from the third direction.

8. The UWB antenna of claim 5, wherein each of the first patch antenna, the second patch antenna, and the third patch antenna further comprise a feeding point, wherein each respective feeding point is at a corner of the respective quadrangle closest to the connector.

9. An ultra-wideband (UWB) antenna comprising:
a dielectric substrate comprising a first surface and a second surface;
a first conductive layer on the first surface of the dielectric substrate, the first conductive layer comprising a first patch antenna, a second patch antenna, a third patch antenna, a first transmission line, a second transmission line, a third transmission line, and a connector; and
a second conductive layer on the second surface of the dielectric substrate,
wherein the first patch antenna comprises a structure configured to receive a UWB signal in which a polarity direction of an electric field is a circular polarization,
wherein the second patch antenna is spaced apart from the first patch antenna in a first direction while not overlapping with the first patch antenna and comprises the structure of the first patch antenna,
wherein the third patch antenna is spaced apart from the first patch antenna in a second direction perpendicular to the first direction while not overlapping with the first patch antenna and comprises the structure of the first patch antenna,
wherein the first transmission line is configured to connect the connector and the first patch antenna, the second transmission line is configured to connect the connector and the second patch antenna, and the third transmission line is configured to connect the connector and the third patch antenna, and wherein the second conductive layer comprises a ground pattern which overlaps with the first patch antenna, the second patch antenna, the third patch antenna, the first transmission line, the second transmission line, and the third transmission line when facing the second conductive layer in a third direction perpendicular to the first direction and the second direction.

10. The UWB antenna of claim 9, wherein each of the first patch antenna, the second patch antenna, and the third patch antenna comprises a quadrangle, wherein each respective quadrangle comprises a first side and a second side extending in parallel to the first direction, a third side and a fourth side extending in parallel to the second direction, a first corner, and a second corner positioned diagonally from the first corner, and wherein a triangular portion of each respective first corner and each respective second corner is removed.

11. The UWB antenna of claim 10, wherein each respective first side comprises a first slit formed towards an inside of the quadrangle, wherein each respective first slit is parallel to the second direction, wherein each respective second side comprises a second slit formed towards an inside of the quadrangle, wherein each respective second slit is parallel to the second direction, wherein each respective third side comprises a third slit, wherein each respective third slit is parallel to the first direction, and wherein each respective fourth side comprises a fourth slit, wherein each respective fourth slit is parallel to the first direction.

12. The UWB antenna of claim 11, wherein each respective first slit, second slit, third slit, and fourth slit comprises a length configured to cause the UWB antenna to resonate in one of UWB communication channels 5 and 9, and wherein UWB communication channel 5 is about 6.25 GHz to 6.75 GHz, and UWB communication channel 9 is about 7.75 GHz to 8.25 GHz.

* * * * *